United States Patent
Chittilappilly et al.

(10) Patent No.: US 10,068,188 B2
(45) Date of Patent: Sep. 4, 2018

(54) MACHINE LEARNING TECHNIQUES THAT IDENTIFY ATTRIBUTION OF SMALL SIGNAL STIMULUS IN NOISY RESPONSE CHANNELS

(71) Applicant: Visual IQ, INC., Needham, MA (US)

(72) Inventors: Anto Chittilappilly, Waltham, MA (US); Payman Sadegh, Alpharetta, GA (US)

(73) Assignee: VISUAL IQ, INC., Needham, MA (US)

( * ) Notice: Subject to any disclaimer, the term of this patent is extended or adjusted under 35 U.S.C. 154(b) by 0 days.

(21) Appl. No.: 15/630,806

(22) Filed: Jun. 22, 2017

(65) Prior Publication Data

US 2018/0005140 A1    Jan. 4, 2018

Related U.S. Application Data

(60) Provisional application No. 62/356,092, filed on Jun. 29, 2016.

(51) Int. Cl.
| | | |
|---|---|---|
| *G06F 15/18* | (2006.01) | |
| *G06N 99/00* | (2010.01) | |
| *G06N 7/00* | (2006.01) | |
| *G06Q 30/02* | (2012.01) | |

(52) U.S. Cl.
CPC ............ *G06N 99/005* (2013.01); *G06N 7/00* (2013.01); *G06Q 30/0246* (2013.01)

(58) Field of Classification Search
CPC ............................ G06F 19/24; G06Q 30/0241
USPC ............................................ 706/12, 15, 45
See application file for complete search history.

(56) References Cited

U.S. PATENT DOCUMENTS

| | | |
|---|---|---|
| 7,370,003 B2 | 5/2008 | Pych |
| 7,949,561 B2 | 5/2011 | Briggs |
| 8,103,663 B2 | 1/2012 | Nishida |
| 8,244,571 B2 | 8/2012 | Cavander |
| 8,321,273 B2 | 11/2012 | Briggs |
| 8,417,560 B2 | 4/2013 | Woods |
| 8,423,406 B2 | 4/2013 | Briggs |
| 8,423,539 B2 | 4/2013 | Nishida |
| 8,468,045 B2 | 6/2013 | Cavander |
| 8,473,343 B2 | 6/2013 | Chalimadugu |
| 8,533,825 B1 | 9/2013 | Marsa |
| 8,561,184 B1 | 10/2013 | Marsa |
| 8,676,647 B2 | 3/2014 | Crites |
| 8,738,440 B2 | 5/2014 | Crites |
| 8,762,874 B2 | 6/2014 | Hong |
| 8,768,943 B2 | 7/2014 | Puttaswamy |

(Continued)

*Primary Examiner* — David R Vincent
(74) *Attorney, Agent, or Firm* — Hanley, Flight & Zimmerman, LLC

(57) ABSTRACT

A method, system, and computer program product identifies attribution of small signal stimulus in noisy response channels. Using machine-learning techniques in a computer, a small signal correlation engine correlates time series stimuli data vectors to time series response data vectors, and generates correlation coefficients that identify contributions of event notifications, including small signal attributes, to aggregated response data. Also using machine-learning techniques in a computer, a learning model simulates variations of stimuli data to predict user responses using the correlation coefficients, including computing a contribution of the small signal attributes of an event notification.

20 Claims, 16 Drawing Sheets

(56) References Cited

U.S. PATENT DOCUMENTS

| | | |
|---|---|---|
| 8,775,248 B1 | 7/2014 | Saldanha |
| 8,788,339 B2 | 7/2014 | Hughes |
| 8,862,498 B2 | 10/2014 | Crites |
| 9,183,562 B2 | 11/2015 | Chittilappilly |
| 2003/0229536 A1 | 12/2003 | House et al. |
| 2005/0235030 A1 | 10/2005 | Lauckhart et al. |
| 2007/0282859 A1 | 12/2007 | Charvet |
| 2008/0162281 A1 | 7/2008 | Davis |
| 2008/0235073 A1 | 9/2008 | Cavander |
| 2009/0089152 A1 | 4/2009 | Davis |
| 2009/0144117 A1 | 6/2009 | Cavander |
| 2009/0216597 A1 | 8/2009 | Cavander |
| 2010/0036700 A1 | 2/2010 | Cavander |
| 2010/0036722 A1 | 2/2010 | Cavander |
| 2010/0042387 A1 | 2/2010 | Gibbon |
| 2010/0042477 A1 | 2/2010 | Cavander |
| 2010/0211455 A1 | 8/2010 | Williams |
| 2010/0332311 A1 | 12/2010 | Jilk |
| 2011/0010211 A1 | 1/2011 | Cavander |
| 2011/0040613 A1 | 2/2011 | Simmons et al. |
| 2011/0071900 A1 | 3/2011 | Kamath |
| 2011/0173047 A1 | 7/2011 | Kelley |
| 2011/0307509 A1 | 12/2011 | Hsiao |
| 2012/0029987 A1 | 2/2012 | Kusumoto |
| 2012/0046991 A1 | 2/2012 | Bai |
| 2012/0054021 A1 | 3/2012 | Kitts |
| 2012/0109882 A1 | 5/2012 | Bouse |
| 2012/0290371 A1 | 11/2012 | Crites |
| 2012/0290373 A1 | 11/2012 | Ferzacca |
| 2012/0303447 A1 | 11/2012 | Hughes |
| 2013/0035975 A1 | 2/2013 | Cavander |
| 2013/0124302 A1 | 5/2013 | Briggs |
| 2013/0166364 A1 | 6/2013 | Kusumoto |
| 2013/0211910 A1 | 8/2013 | Yerli |
| 2013/0332223 A1 | 12/2013 | Cavander |
| 2013/0346185 A1 | 12/2013 | Chalimadugu |
| 2014/0067518 A1 | 3/2014 | Mcgovern |
| 2014/0074587 A1 | 3/2014 | Briggs |
| 2014/0081740 A1 | 3/2014 | Lipka |
| 2014/0100947 A1 | 4/2014 | Kitts |
| 2014/0188596 A1 | 7/2014 | Nangle, III |
| 2014/0188597 A1 | 7/2014 | Nangle, III |
| 2014/0195339 A1 | 7/2014 | Paulsen |
| 2014/0244345 A1 | 8/2014 | Sollis |
| 2014/0244380 A1 | 8/2014 | Willeitner |
| 2014/0278620 A1 | 9/2014 | Khan |
| 2014/0278622 A1 | 9/2014 | Chen |
| 2014/0324567 A1 | 10/2014 | Saldanha |
| 2014/0379490 A1 | 12/2014 | Schnabl |
| 2015/0186924 A1 | 7/2015 | Chittilappilly |
| 2015/0186925 A1 | 7/2015 | Chittilappilly |
| 2015/0186926 A1 | 7/2015 | Chittilappilly |
| 2015/0220971 A1 | 8/2015 | Raj |
| 2015/0363824 A1 | 12/2015 | Polson |
| 2016/0063427 A1 | 3/2016 | Xu |
| 2016/0098735 A1 | 4/2016 | Sinha |
| 2016/0140602 A1 | 5/2016 | Wood et al. |
| 2017/0180284 A1* | 6/2017 | Smullen ................ H04L 67/322 |

* cited by examiner

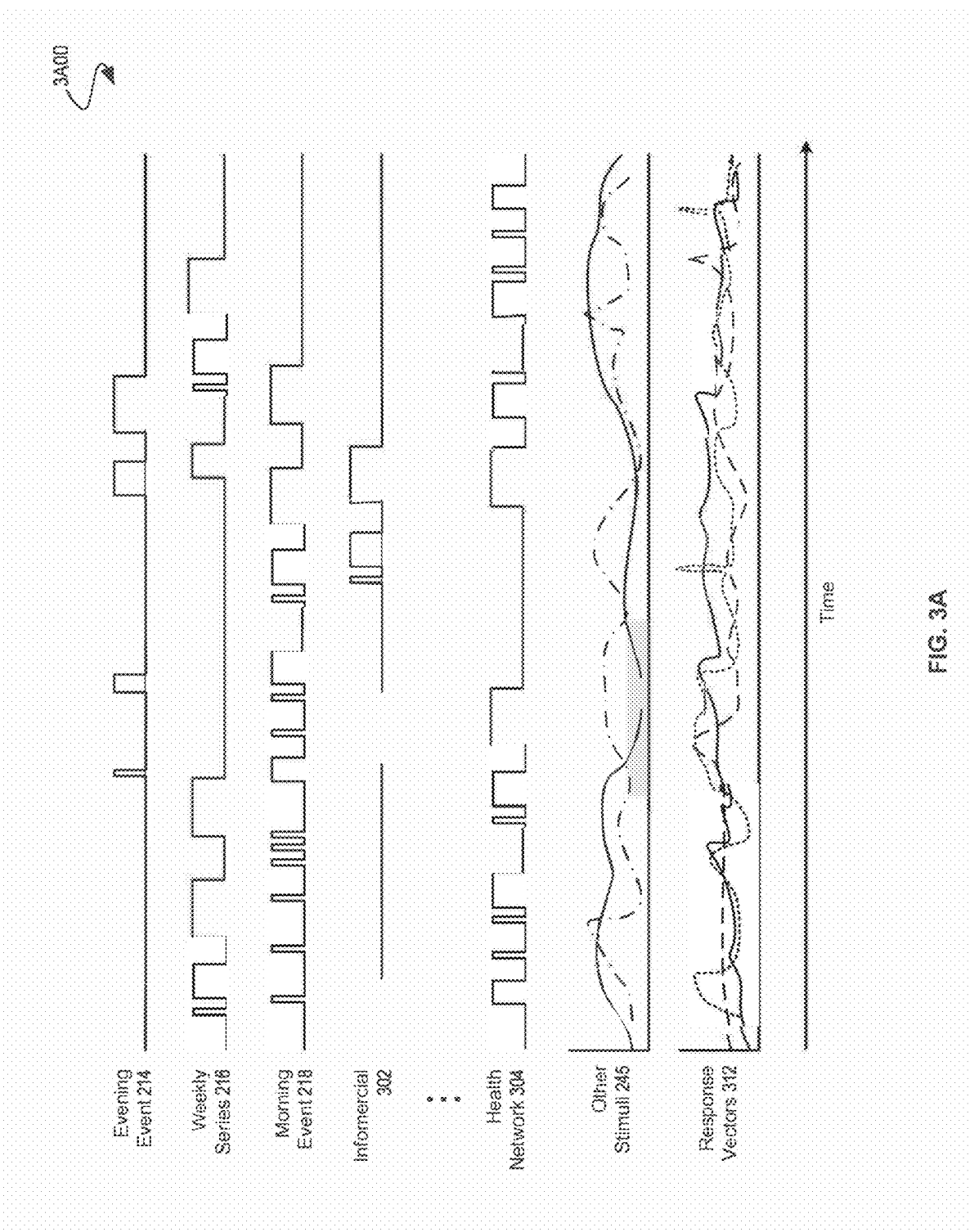

Stimulus Data Structure 910

| | | | | | DR TV Impression Data (Dimensions) | | | | | Impression Data (Metrics) | |
|---|---|---|---|---|---|---|---|---|---|---|---|
| Date | Timestamp | Product | Campaign | Geo | Publisher | Placement | Creative | Duration | Demography | Impressions Served | Media Spend |
| Date | At least up to the minute | Product Name | Campaign Name | DMA | Station | Spot | Creative | Duration | Demography | Impressions Served | Media Spend |
| 9/28/2013 | 11:55:02 | Product 1 | Campaign 1 | 113 | ABC | Who Wants to be | Creative 1 | 30 seconds | Females 18-55 | 1,234,567 | $10,000 |
| 9/28/2013 | 11:57:30 | Product 2 | Campaign 2 | 175 | FOX | NewsHour | Creative 2 | 180 seconds | Males 35-55 | 5,678,755 | $20,000 |
| 9/28/2013 | 13:57:30 | Product 3 | Campaign 3 | 135 | CNN | Anderson Cooper | Creative 3 | 360 seconds | Adults 18-55 | 9,123,755 | $30,000 |
| ... | | | | | | | | | | | |

Stimulus Touchpoint Attribute Sequences 912

Response Data Structure 920

| | | DR TV Impression Data (Dimensions) | | | | Response Data (Metrics) | |
|---|---|---|---|---|---|---|---|
| Date | Timestamp | Channel | Response Channel | Product Purchased | Geography | Interest | Revenue | LTV |
| Date | At least up to the minute | | Response Channel | Product Purchased | DMA of the purchaser | Keyword used by the purchaser | Revenue in $US | Lifetime Value in $US |
| 9/28/2013 | 11:55:02 | | Call Center | Product 1 | 113 | Interest 1 | $23.56 | $995 |
| 9/28/2013 | 11:57:30 | | Paid Search | Product 2 | 135 | Keyword 1 | $35.80 | $1,256 |
| 9/28/2013 | 13:57:30 | | Website | Product 3 | 175 | Page 1 | $75.21 | $775 |
| 9/28/2013 | 13:57:30 | | Organic Search | Product 3 | 135 | Keyword 2 | $37.00 | $527 |
| ... | | | | | | | | |

Response Measurement Attribute Sequences 922

MACHINE LEARNING TECHNIQUES THAT IDENTIFY ATTRIBUTION OF SMALL SIGNAL STIMULUS IN NOISY RESPONSE CHANNELS

RELATED APPLICATIONS

The present application claims the benefit of priority to co-pending U.S. Provisional Patent Application Ser. No. 62/356,092, entitled "Identifying Small Signal Media Stimulus Correlations in Noisy Media Response Channels", filed Jun. 29, 2016, which is hereby expressly incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosure relates to the field of media spend optimization and more particularly to techniques for identifying small signal stimulus correlations in noisy response channels.

BACKGROUND

The technological capability availed by today's computing systems and data communications systems (e.g., networks, the Internet) has greatly impacted the ability to communicate to a vast number of users. Technology permits implementing systems that communicate information, such as in the form of messages and notifications, to a vast numbers of users in order to elicit a desired response from the users. For example, a communications and management system may be built to intervene in the daily routine of a diabetes patient in order to effectively manage the patient's blood glucose levels. To this end, management systems may send various types of notifications, at various times, to remind and inform a user so as to effectively manage the user for a desired outcome. In addition to transmitting notifications and messages to users, these communication and management systems may also include a means to receive user responses in order to receive feedback as to whether the user performed the desired task. For example, in a diabetes management system, the system may record a response, using technology, that indicates the user took their medication at a specific time of day. The process of transmitting notifications and messages to users to effectuate a user response, as well as receiving and recording those responses constitute the basis for such a management system.

It is desirable to use such computing and networking capabilities to gain a deeper understanding of the impact of event notifications on events. For example, if a system propagates messages to a user to remind the user to take their medication at specific times of the day, it is desirable to understand what messages are effective at getting the patient to properly take their medication. Since an event campaign may comprise many different types of messages and notifications, it is not clear which messages or notifications were effective in getting the desired response. As such, a system administrator may desire to know what messages, sent when, and in what combinations, were most effective at eliciting the desired result. Given the capabilities of computing and networking, there are many mediums, or channels, that may be used to deliver messages to users. For example, messages may be delivered into an environment, such as a house, using various modes of communications, such as Internet messages (e.g., display messages), email, text messages on mobile devices, notifications on television, telephone calls, announcement over audio/visual medium, etc. These systems may also deploy messages to users in order to elicit commercial activity from a user, such as conversions to purchase a product or service.

Various techniques for calculating the attribution of event campaign stimuli (e.g., event notifications) to responses have been considered. Such attribution calculations are largely enabled not only by the voluminous online user activity data available (e.g., cookies, pixel tags, mobile tracking, etc.), but also by various offline data available (e.g., in-store purchase records, compliance records, etc.). However, in "noisy" response channels (e.g., organic search, surveys, compliance feedback, etc.) that may include an aggregate response from multiple event campaigns and event stimuli, legacy approaches have limitations. Such legacy approaches might provide attribution at a channel level (e.g., TV, radio, print, search, etc.), yet not provide attribution at a more granular sub-channel level. For example, a legacy approach might attribute call center purchases to a TV infomercial providing the toll-free number of the call center at the "TV" media channel level, yet not identify more specific airings and related characteristics (e.g., TV station, spot, campaign, creative, etc.) that contributed most to the purchases. Techniques are needed to address the problem of determining sub-channel stimulus attribution in aggregated response channels.

BRIEF DESCRIPTION OF THE DRAWINGS

FIG. 3A presents a diagram illustrating stimulus signals and response signals for a TV media campaign.

FIG. 9 is a diagram depicting data structures used in systems for identifying small signal media stimulus correlations in noisy media response channels, according to some embodiments.

DETAILED DESCRIPTION

Overview

Figure 1:
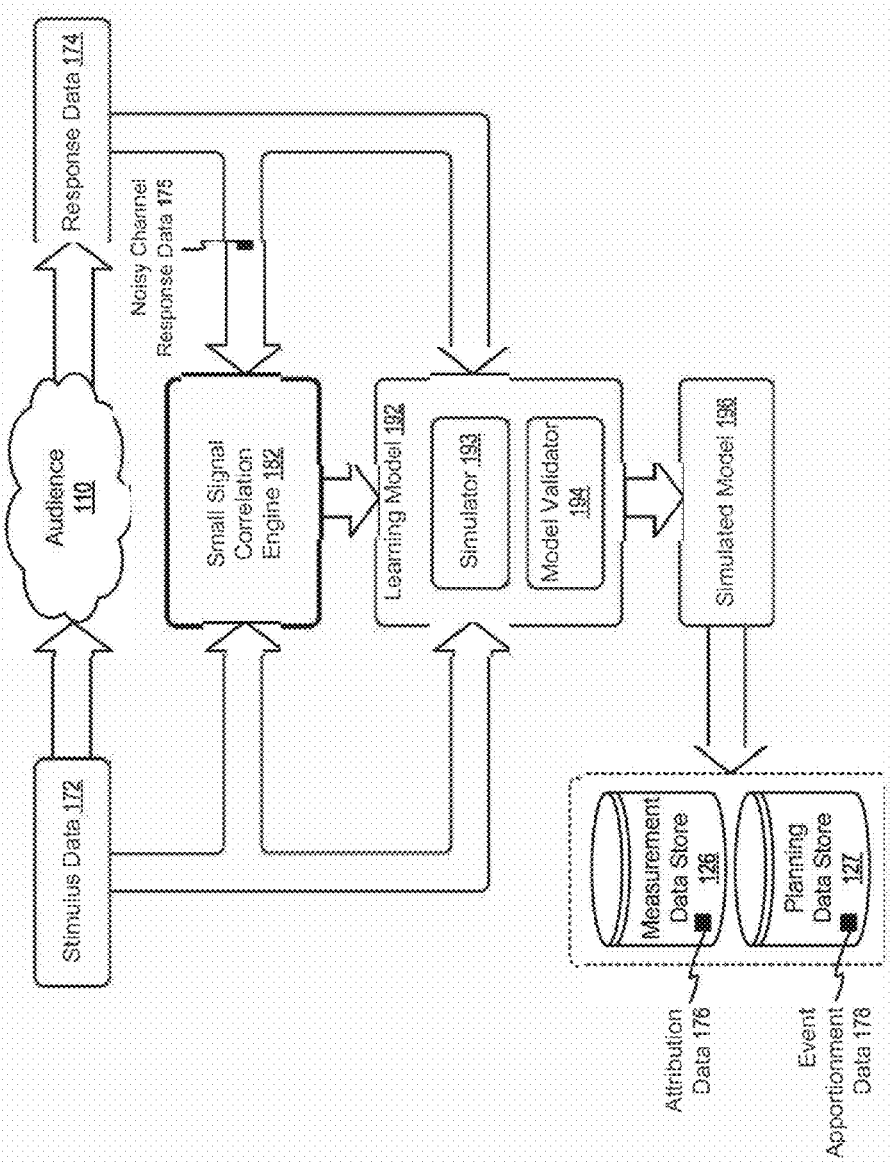
FIG. 1 depicts a partitioning for a system that implements techniques for identifying small signal media stimulus correlations in noisy media response channels, according to an embodiment.

In one or more embodiments, the techniques described herein further discuss (6) calculating contribution values for the stimulus attribute sequences based at least in part on the correlation coefficients, and (7) apportioning new stimulus based at least in part on the correlation coefficients.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Solutions Rooted in Technology

The appended figures corresponding discussion given herein provides sufficient disclosure to make and use systems, methods, and computer program products that address the aforementioned issues with legacy approaches. More specifically, the present, disclosure provides a detailed description of techniques used in systems, methods, and in computer program products for identifying small signal stimulus correlations in user response channels. Certain embodiments are directed to technological solutions for receiving electronically at a server data records corresponding to multiple user stimulus vectors and user response vectors, and generating correlation coefficients to model the influence of the user stimulus vectors on the user response vectors at sub-channel levels (e.g., campaign, station, spot, creative, etc.), which embodiments advance the relevant technical fields, as well as advancing peripheral technical fields. The disclosed embodiments modify and improve over legacy approaches. In particular, the herein-disclosed techniques provide technical solutions that address the technical problems attendant to determining sub-channel user stimulus attribution in aggregated user response channels. Such technical solutions serve to reduce use of computer memory, reduce demand for computer processing power, and reduce communication overhead needed. Specifically, the herein disclosed technical solutions may eliminate the computing and storage resources required by legacy techniques in installing further direct response measurement facilities associated with certain noisy media response channels. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Reference is now made in detail to certain embodiments. The disclosed embodiments are not intended to be limiting of the claims.

DESCRIPTIONS OF EXEMPLARY EMBODIMENTS

FIG. 1 depicts a partitioning 100 for a system that implements techniques for identifying small signal media stimulus correlations in noisy user response channels. As an option, one or more instances of partitioning 100 or any aspect thereof may be implemented in the context of the architecture and functionality of the embodiments described herein. Also, the partitioning 100 or any aspect thereof may be implemented in any desired environment.

As shown in FIG. 1, the stimulus data 172 is presented to the user group 110 resulting in the response data 174. Generally, at least one response measurement in the response data 174 is attempted for each stimulus associated with the stimulus data 172. For example, an event notification in a user stimulus channel might be measured by a user response in the user response channel. As shown, a learning model 192 may be formed using the stimulus data 172 and response data 174. The learning model 192 serves to predict a particular channel response from a particular channel stimulus. For example, if an event notification from last Saturday and Sunday resulted in a user performing a specific task, then the learning model 192 may predict that additional event notifications next Saturday and Sunday might result in the same user behavior. One technique to train the learning model 192 uses a simulator 193 and a model validator 194, as shown. The simulator 193 may provide various subsets of the stimulus data 172 to the learning model 192 and the responses predicted by the learning model 192 are compared by the model validator 194 to the actual, responses from the response data 174. The results of the comparison may be used to adjust the learning model 192 such that a true attribution of response credit to a given stimulus and/or set of stimuli may be established. Such instances of attribution data 176 may be stored in the measurement data store 126. Various techniques might be implemented in the learning model 192 to address various attribution biases (e.g., channel saturation, etc.).

A simulated model. 196 may further serve to determine a set of stimuli and associated set of predicted responses even when direct measurements are not available. The simulated model 196 may be formed using any machine learning techniques and/or the operations shown in FIG. 1. Specifically, the embodiment of FIG. 1 supports a technique where variations (e.g., mixes) of instances of the stimulus data 172 are delivered by the simulator 193 to the learning model 192 to capture predictions of the responses to a particular various event notifications. The full range of stimulus variations and associated predicted response variations form, in part, the simulated model 196. Such techniques may also serve to establish response and performance limits. In some embodiments, a systems manager may use the simulator 193 and the simulated model 196 to establish instances of event apportionment data 178 (e.g., in the planning data store 127) used in various types of campaigns.

As shown, the herein disclosed techniques solve such technical problems by identifying small signal stimulus correlations in noisy response channels using, in part, a small signal correlation engine 182. More specifically, the small signal correlation engine 182 may receive electronic data records comprising the stimulus data 172 and electronic data records comprising the response data 174 (e.g., noisy channel response data 175), and generate correlation coefficients each stimulus signal comprising the stimulus data 172. The correlation coefficients may indicate a correlation of the stimulus signals to any or all of the response signals comprising the response data 174. The correlation coefficients effectively serve to "source separate" the multiple contributors to a given response and/or set of responses. The correlation coefficients and other associated model parameters may be delivered to the learning model such, that sub-channel attribution (e.g., contribution values) of stimulus signals may be calculated. Such techniques shown in FIG. 1 and described herein may be applied to various channels where sub-channel (e.g., granular) stimulus attribution is required for accurate apportioning of event notification.

Figure 2A:
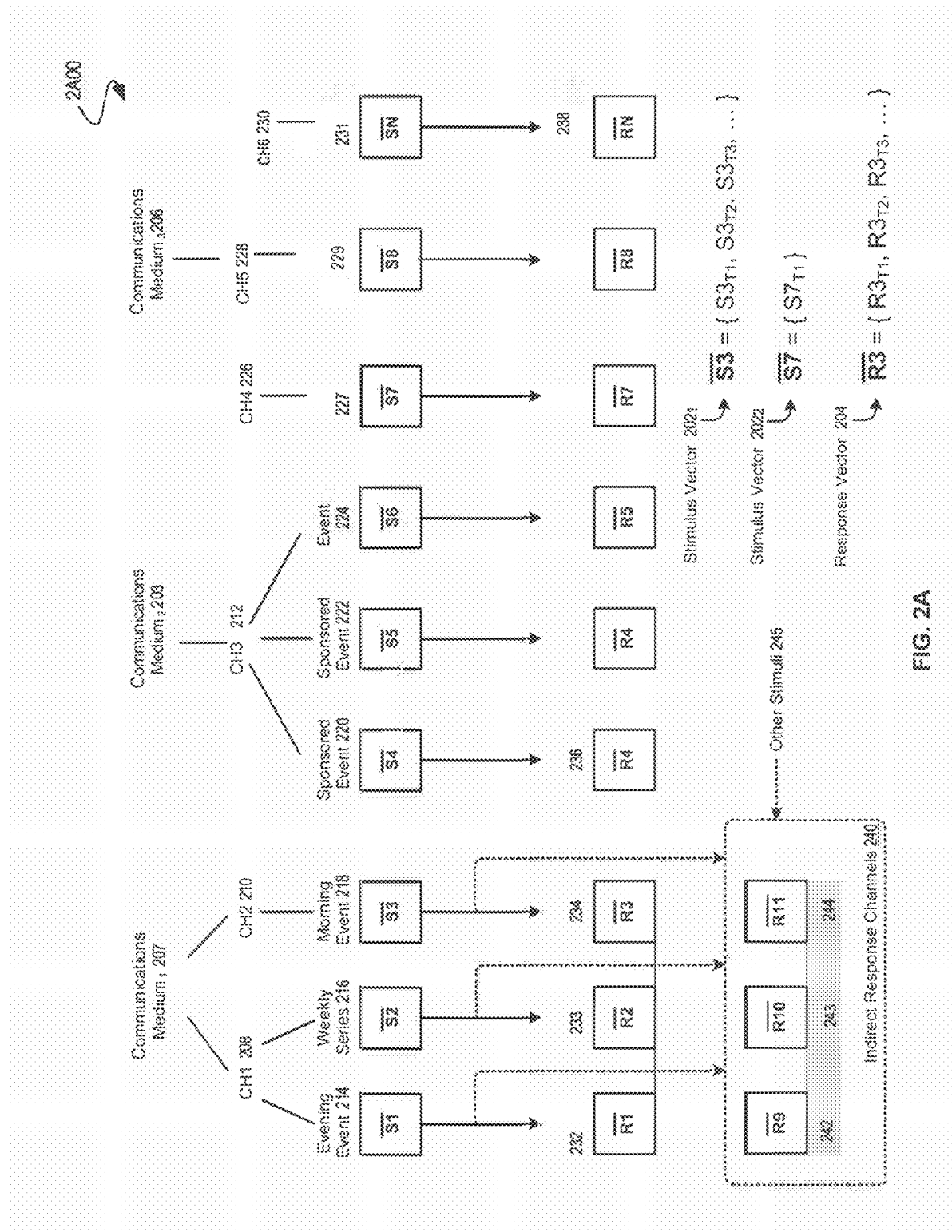
FIG. 2A is a portfolio schematic showing multiple media stimulus channels and response channels in environments for implementing techniques for identifying small signal media stimulus correlations in noisy media response channels, according to some embodiments.

FIG. 2A is a portfolio schematic 2A00 showing multiple event stimulus channels and response channels in environments for implementing techniques for identifying small signal event stimulus correlations in noisy response channels. As an option, one or more instances of portfolio schematic 2A00 or any aspect thereof may be implemented in the context of the architecture and functionality of the embodiments described herein. Also, the portfolio schematic 2A00 or any aspect thereof may be implemented in any desired environment.

As shown, the portfolio schematic 2A00 includes three types of communication mediums, namely communications medium$_1$ 207, communications medium$_2$ 203, and communications medium$_3$ 206. Under each communications medium are shown one or more channels for deliver of events. Communications medium$_1$ 207 comprises channels named CH1 208 and CH2 210. Communications medium$_2$ 203 comprises channels named CH3 212. Communications medium$_3$ 206 comprises distribution through CH4 226, CH5 228, and CH6 230. More specifically, the portfolio includes events for communications medium$_1$ 207 during the evening 214, weekly series 216, and morning 218. The event portfolio also includes communications medium$_2$ 203 notifications in the form of a sponsored public service announcement 220, a sponsored event 222, and an opt-in event 224. The event portfolio also includes communications medium$_3$ 206 for events delivered by mediums 227, a print media placement 229, and a public bulletin board 231, as shown. The stimuli comprising such events may be viewed in more detail. For example, the events for communications medium$_1$ 207 on station CH1 208 during the evening 214 may comprise certain attributes characterized by a timestamp, a duration, a placement, a creative, and/or other characteristics. In some cases, the systems manager might want to know a particular airing that most influenced a particular response.

As depicted in FIG. 2A, for each channel and sub-channel, there is one or more stimuli (e.g., $\overline{S1}, \overline{S2}, \overline{S3}$, to $\overline{SN}$) and a respective measured response (e.g., $\overline{R1}, \overline{R2}, \overline{R3}$, to $\overline{RN}$). As shown, there may be a one-to-one correspondence between a particular stimulus and its response. For example, the communications medium$_2$ 207 evening event 214 is depicted with stimulus $\overline{S1}$, and has an associated response $\overline{R1}$ (e.g., using a survey 232 metric). In some cases, certain sets of indirect response channels 240 may be associated with certain stimuli. For example, the response channels $\overline{R9}$, $\overline{R10}$, and $\overline{R11}$, comprising the indirect response channels 240, might be associated with the event campaign using the communications medium$_1$ 207. In this case, the response data from the indirect response channels 240 might be available (e.g., as response data 174) in aggregate, and/or include the influence of instances of other stimuli 245 (e.g., not from communications medium$_1$ 207).

The event stimuli and user responses discussed herein are often formed as a sequential time-series (e.g., sequences) of data items (e.g., attributes, values, measurements) representing various stimulus instances (e.g., events) and various user response instances, respectively. An exemplary embodiment of data structures used for such stimulus event sequences and user response measurement attribute sequences is described in FIG. 9. For notational convenience, such temporal signals may be represented as stimulus vectors, such as the stimulus vector $202_1$ (e.g., corresponding to instances in time of stimulus $\overline{S3}$), the stimulus vector $202_2$ (e.g., corresponding to instances in time of stimulus $\overline{S7}$), and the response vector 204 (e.g., corresponding to instances in time of response $\overline{R3}$). As shown, a stimulus or response vector may have many data items (e.g., stimulus vector $202_1$ comprising multiple events, or could have as few as one data item (e.g., stimulus vector $202_2$ comprising a single event corresponding to event 227). In some cases, the time interval and/or time stamp of certain stimuli and certain responses may be the same, such as shown in FIG. 2A (e.g., times T1, T2, T3, etc.). In other cases, the time interval and/or time-stamp of certain stimuli and certain responses may be different. Further, the time-series may be presented in a native time unit (e.g., weekly, daily) and may be apportioned over a different time unit. For example, stimulus S3 corresponds to a weekly event, even though the stimulus to be considered actually occurs daily (e.g., during the morning). The weekly stimulus spend may be apportioned to a daily stimulus occurrence. In some situations, the time unit in a time-series may be granular (e.g., minutes, seconds). When the interval is short, (e.g., seconds or minutes) for a given vector or collection of vectors, a visualization plot of the vector or vectors over time may appear as a continuous signal. Apportioning over time periods or time units may be performed using any known techniques. Vectors (e.g., instances of stimulus vectors, instances of response vectors, etc.) may be formed from any time-series in any time units and may be apportioned to another time-series using any other time units.

Figure 2B:
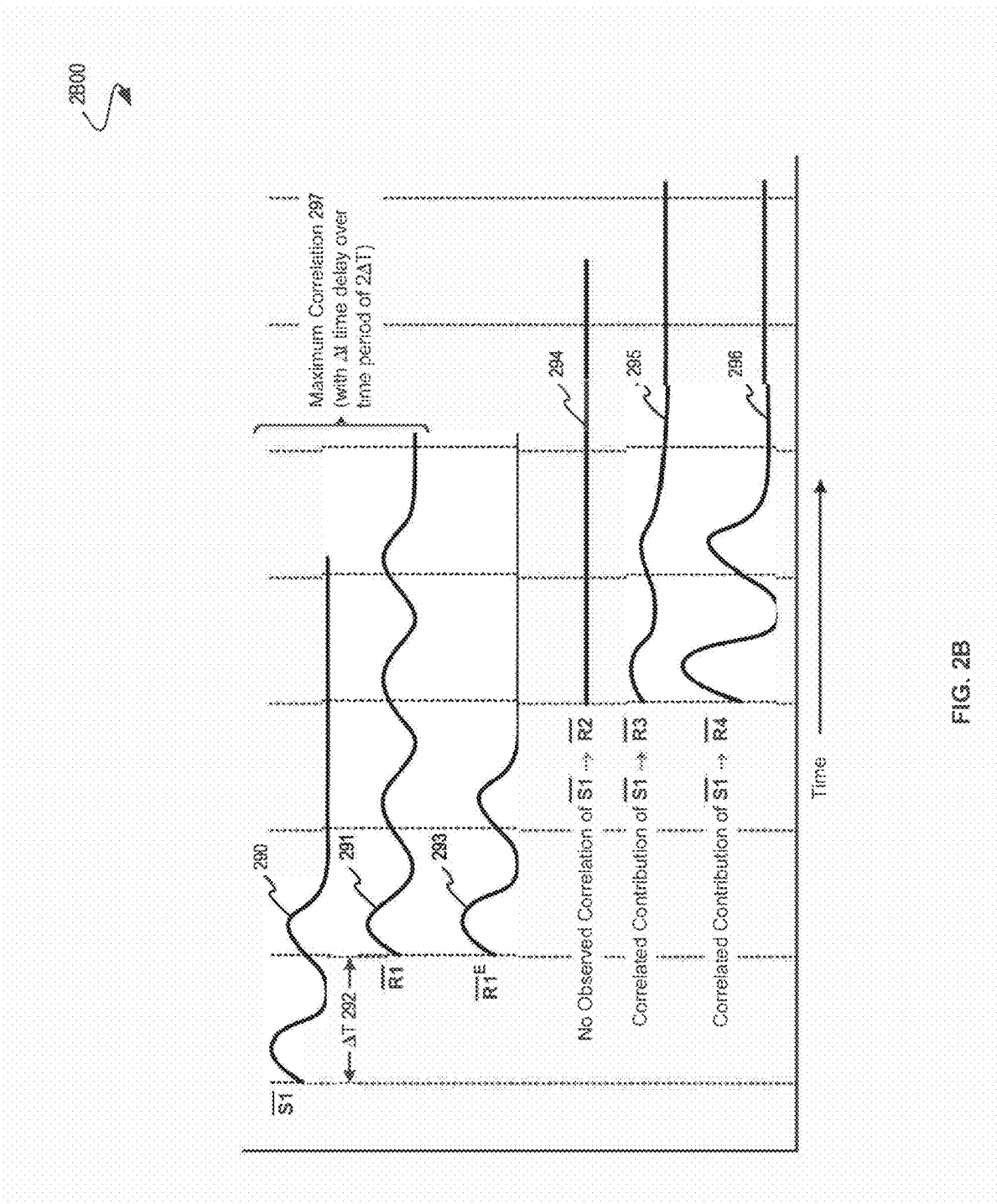
FIG. 2B is a correlation chart showing time-based and value-based correlation techniques used identify small signal media stimulus correlations in noisy media response channels, according to some embodiments.

FIG. 2B is a correlation chart 2B00 showing time-based and value-based correlation techniques used to identify small signal event stimulus correlations in noisy user response channels. As an option, one or more instances of correlation chart 2B00 or any aspect thereof may be implemented in the context of the architecture and functionality of the embodiments described herein. Also, the correlation chart 2B00 or any aspect thereof may be implemented in any desired environment.

A particular stimulus in a first event stimulus channel (e.g., $\overline{S1}$) might produce measured response results is a first user response channel (e.g., $\overline{R1}$). Additionally, a stimulus in a first event stimulus channel (e.g., $\overline{S1}$) might produce results, or lack of results, as given by measured results in a different response channel (e.g., $\overline{R3}$). Such, correlation of results or lack of results may be automatically detected, and a scalar value representing the extent of correlation may be determined mathematically from any pair of vectors. In the discussion just below, the correlation of a time-series response vector is considered with respect to a time-series stimulus vector. In some cases (e.g., noisy response channels with multiple stimulus channels), the correlation between stimulus and response may be one-to-many or many-to-one. Correlations may be positive (e.g., the time-series data moves in the same directions), or negative (e.g., the time-series data moves in the opposite directions), or zero (e.g., no correlation). Those skilled in the art will recognize there are many known-in-the-art techniques to correlate any pair of curves. For example, correlation may be based on a distance function that, determines a spatial distance and/or a temporal distance between event attributes (e.g., data items) and response attributes (e.g., data items).

As shown, vector $\overline{S1}$ is comprised of a series of changing values (e.g., depicted by the regression-fitted function resulting in the curve 290). The response $\overline{R1}$ is shown as curve 291. As may be appreciated, even though the curve 291 is not identical to the curve 290 (e.g., it has undulations in the tail) the curve 291 is substantially value-correlated to curve 290. Maximum value correlation 297 occurs when curve 291 is time-shifted by a Δt 292 amount of time relative to curve 290 (see the Δt 292 graduations on the time scale) and a time period of 2Δt is considered. For example, the Δt 292 might represent a delay in the response to a given stimulus. The amount of correlation (see discussion infra) and amount of time shift may be automatically determined. Various examples of channel correlations are presented in Table 1 and in FIG. 2B.

TABLE 1

Cross-correlation examples

| Stimulus Channel → Response channel | Description |
|---|---|
| $\overline{S1}$→ $\overline{R2}$ (see curve 294) | No correlation |
| $\overline{S1}$→ $\overline{R3}$ (see curve 295) | Correlates if time shifted and attenuated |
| $\overline{S1}$→ $\overline{R4}$ (see curve 296) | Correlates if time shifted and amplified |

In some cases, a correlation calculation may identify a negative correlation where an increase in a first stimulus channel causes a decrease in a second response channel. Further, in some cases, a correlation calculation may identify an inverse correlation where a large increase in a first channel causes a small increase in a second channel. In still further cases, there may be no observed correlation (e.g., see curve 294), or in some cases correlation is increased when exogenous variables are considered (e.g., see curve $\overline{R1}^E$ 293).

In some cases a correlation calculation may hypothesize one or more causation effects. And in some cases correlation conditions are considered when calculating correlation such that a priori known conditions may be included (or excluded) from the correlate on calculations.

Also, as may be appreciated, there is no correlation to the shown time-series $\overline{R2}$. The curve 295 is substantially value-correlated (e.g., though scaled down) to curve 290, and is time-shifted by a second Δt amount of time relative to curve 290. The curve 296 is substantially value-correlated (e.g., though scaled up) to curve 290, and is time-shifted by a second Δt amount of time relative to curve 290.

In some cases, correlation parameters are provided to handle specific correlation cases. In one case, the correlation between two time-series may be determined to a scalar value (e.g., Pearson's product-moment coefficient) using Eq. 1.

$$r = \frac{n\sum xy - (\sum x)(\sum y)}{\sqrt{n(\sum x^2) - (\sum x)^2} \sqrt{n(\sum y^2) - (\sum y)^2}} \quad (1)$$

where:
x represents components of a first time-series,
y represents components of a second time-series, and
n is the number of {x, y} pairs.

Other correlation techniques are possible, and a systems manager might provide an indication and parameters associated with such alternative correlations. For example, parameters known as "AR", "MA", and "BW" are used in an autoregressive integrated moving average model (ARIMA). Other parameters such as "FF" to characterize a forgetting factor, and "L" to characterize a length duration of the response variables may be included in correlation calculations.

In some cases, while modeling a time-series, not all the scalar values in the time-series are weighted equally. For example, more recent time-series data values found in the historical data may be given a higher weight as compared to older ones. Various shapes of weights to overlay a time-series are possible, and one exemplary shape is the shape of an exponentially decaying model.

Such correlation techniques may be used by the herein disclosed techniques for identifying small signal event stimulus correlations in noisy response channels. An illustration of such a noisy response channel is shown in FIG. 3A.

FIG. 3A presents a diagram 3A00 illustrating stimulus signals and response signals for a TV media campaign. As an option, one or more instances of diagram 3A00 or any aspect thereof may be implemented in the context of the architecture and functionality of the embodiments described herein. Also, the diagram 3A00 or any aspect thereof may be implemented in any desired environment.

The diagram 3A00 illustrates a time-series visualization of the various stimulus signals (e.g., vectors) and response signals (e.g., vectors) associated with a campaign. Specifically, FIG. 3A depicts an events campaign having multiple event stimulus signals and a noisy response channels that may use the herein disclosed techniques to identify correlations between such small signal stimulus and the noisy response channels. More specifically, in reference to the portfolio schematic 2A00 in FIG. 2A, the stimulus signals for the shown campaign comprise stimulus vectors associated with the evening event 214, the weekly series 216 spend, and the morning event 218. The diagram 3A00 further shows stimulus vectors associated with an infomercial 302 and a health network 304. As earlier mentioned, the stimulus vectors each represent a sequential time-series of data items corresponding to various stimulus instances. For example, the pulses illustrated in FIG. 3A may represent certain times and durations of airings in the respective media spend sub-channels.

Also represented in diagram 3A00 are signal waveforms associated with the other stimuli 245 from FIG. 2A, and certain instances of response vectors 312 measured and collected for the campaign. The signal waveforms associated with the other stimuli 245 may represent stimulus vectors not included in the subject campaign, yet influence the response vectors 312. Further, the signal waveforms associated with the response vectors 312 may represent response vectors from certain response channels identified as being associated with the subject campaign. For example, the response vectors 312 might comprise responses from direct response channels (e.g., R1, R2 and R3, etc.) and/or from indirect response channels, such as the indirect response channels 240 (e.g., R9, R10 and R11, etc.).

As shown, the response vectors 312, when aggregated, may comprise a noisy signal, presenting a challenge to identifying respective correlations between each sub-channel stimuli and the response data. The example in diagram 3A00 is merely one example. Some system campaigns may have a higher number of stimulus vectors and response vectors than shown. In such cases, the technological solution provided by the herein disclosed techniques may be implemented. Such an implementation is described in more detail in FIG. 3B.

Figure 3B:
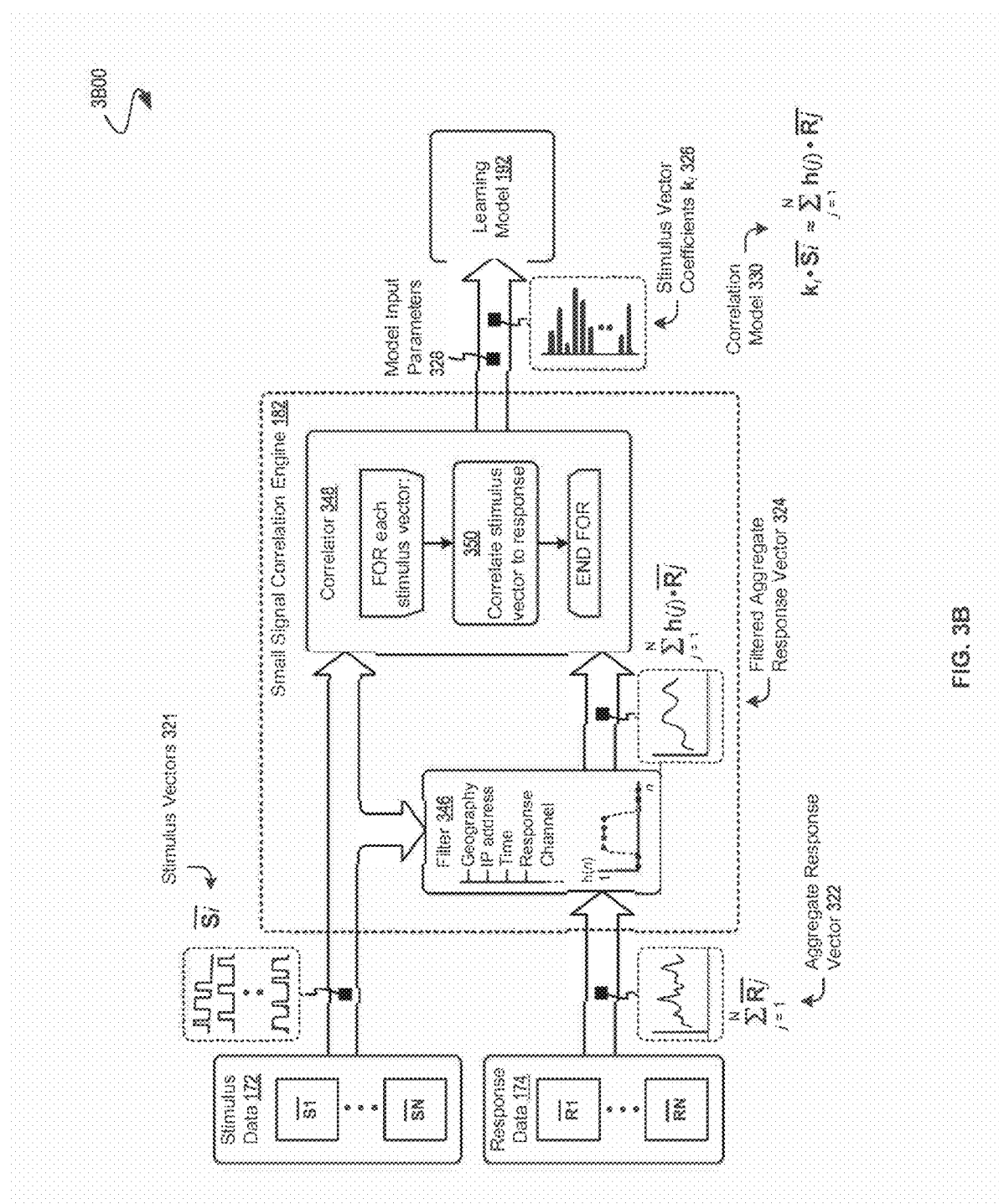
FIG. 3B presents a schematic of a signal and data flow for implementing techniques for identifying small signal media stimulus correlations in noisy media response channels

FIG. 3B presents a schematic 3B00 of a signal and data flow for implementing techniques for identifying small signal event stimulus correlations in noisy user response channels. As an option, one or more instances of schematic 3B00 or any aspect thereof may be implemented in the context of the architecture and functionality of the embodiments described herein. Also, the schematic 3B00 or any aspect thereof may be implemented in any desired environment.

Shown in schematic 3B00 are techniques for determining sub-channel event stimulus attribution in aggregated and/or noisy user response channels (e.g., the response vectors 312). Specifically, FIG. 3B describes further data flow and operations details pertaining to the small signal correlation engine 182 disclosed herein. Specifically, the small signal correlation engine 182 is shown to receive electronic data records comprising stimulus data 172 and response data 174. In exemplary cases described herein, the stimulus data may be associated with multiple stimulus channels (e.g., S1 to SN) producing a plurality of stimulus vectors 321. More specifically, the stimulus vectors 321 may comprise stimulus touchpoint attribute sequences describing the touchpoints events experienced by one or more audiences. Further, the response data 174 may be associated with multiple measured response channels (e.g., R1 to RN) producing a plurality of response vectors that may be combined in an aggregate response vector 322. More specifically, the aggregate response vector 322 may comprise response measurement attribute sequences capturing the user interactions (e.g., specific task(s) performed by certain audience members). Given such instances of the stimulus vectors 321 and the aggregate response vector 322, the small signal correlation engine 182 may be used to identify correlations of small signal event stimulus (e.g., stimulus vectors 321) to the responses in noisy user response channels (e.g., comprising the aggregate response vector 322).

In some embodiments, the small, signal correlation engine 182 selects a portion of the aggregate response vector 322 using a filter 346. For example, a certain portion of responses might be selected for processing (e.g., correlation) based in part on the response geography (e.g., geographical origin of the responses), the IP address of the respondent, the response time, the response channel, and/or other filter characteristics. The transfer function h(n) of the filter 346 may also be a vector that will serve to include a first portion of the response vectors comprising the aggregate response vector 322 in a filtered aggregate response vector 324, and exclude a second portion of the response vectors comprising the aggregate response vector 322 from the filtered aggregate response vector 324. The purpose of such filtering may vary. For example, the filter 346 may be used to partition the correlation operation to balance the use of computing resources. As another example, the filter 346 may be used to reduce the time to reach a correlation solution for a given instance of the filtered aggregate response vector 324 and a given set of stimulus vectors 321.

A correlator 348 receives the stimulus vectors 321 and the filtered aggregate response vector 324 and calculates a corresponding set of stimulus vector coefficients $k_i$ 326 (e.g., represented by the magnitude of the bar chart shown in FIG. 3B). In one or more embodiments, the stimulus vector coefficients $k_i$ 326 may be calculated by looping through each stimulus vector comprising the stimulus vectors 321 and correlating the selected stimulus vector to the filtered aggregate response vector 324 (see operation 350). The relationship between the stimulus vectors 321, the stimulus vector coefficients $k_i$ 326, and the filtered aggregate response vector 324 may be described in a correlation model 330. In some embodiments, the stimulus vector coefficients k, 326 and a certain set of model input parameters 328 may be delivered to the learning model 192. For example, the stimulus vector coefficients $k_i$ 326 may be used to calculate sub-channel attribution (e.g., contribution values) by iterating over each of the stimulus vectors 321. In some cases, correlations and attributions for certain events comprising each of the stimulus vectors 321 may also be calculated.

Figure 4:
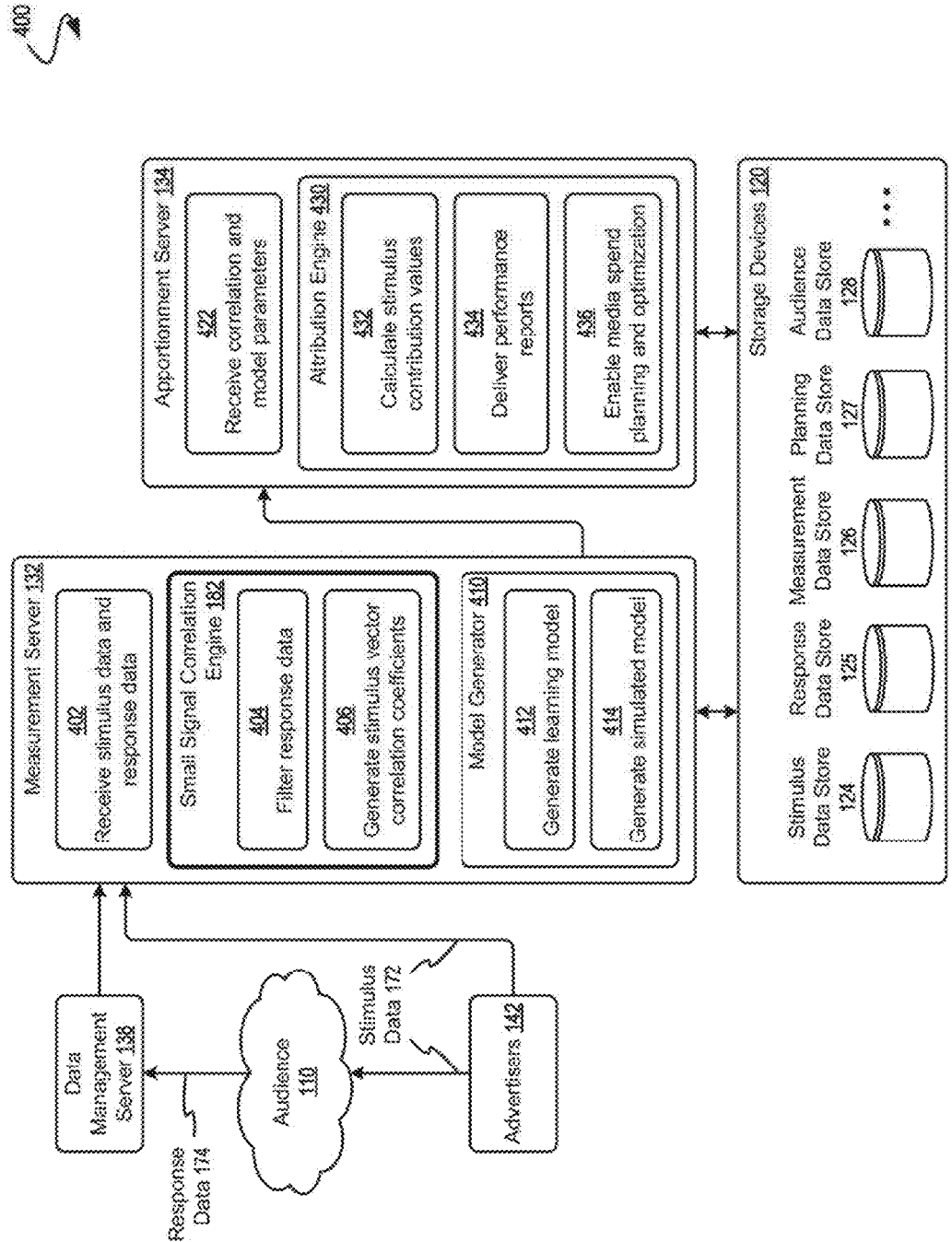
FIG. 4 depicts a subsystem used to identify small signal media stimulus correlations in noisy media response channels, according to some embodiments.

FIG. 4 depicts a subsystem 400 used to identify small signal event stimulus correlations In noisy user response channels. As an option, one or more instances of subsystem 400 or any aspect thereof may be implemented in the context of the architecture and functionality of the embodiments described herein. Also, the subsystem 400 or any aspect thereof may be implemented in any desired environment.

As shown, events may be generated by the system administrators 142 as a set of stimulus data 172 to the audience 110 to produce a set of response data 174 captured by the data management server 138. The measurement server 132 may receive electronic data records associated with the stimulus data 172 and response data 174 (see operation 402). The stimulus data 172 and response data 174 may be stored in one or more storage devices 120 (e.g., stimulus data store 124, response data store 125, etc.). The stimulus data 172 and response data 174 may further be used by the small signal correlation engine 182 to identify small signal event stimulus correlations in noisy user response channels. Specifically, the small signal correlation engine 182 may filter the response data 174 (see operation 404) and generate stimulus vector correlation coefficients (see operation 406).

The stimulus vector correlation coefficients and other model parameters may be used by a model generator 410 to generate a learning model (see operation 412) and generate a simulated model (see operation 414).

As shown, the apportionment server 134 may receive the model parameters from the model generator 410 in the measurement server 132 (see operation 422) and enable an attribution engine 430 to calculate stimulus contribution values (see operation 432). For example, in some embodiments, the attribution engine 430 uses the stimulus vector correlation coefficients, generated by the small signal correlation engine 182, to calculate the granular sub-channel stimulus contribution values. The attribution engine 430 may deliver performance reports (see operation 434) associated with the stimulus data 172, response data 174, and/or various marketing campaigns and/or other data. Further, the attribution engine 430 may enable (e.g., for system managers) media spend planning and/or optimization based in part on the data and/or operations availed by the subsystem 400.

The subsystem 400 presents merely one partitioning. The specific example shown where the measurement server 132 comprises the small signal correlation engine 182 and the model generator 410, and where the apportionment server 134 comprises the attribution engine 430 is purely exemplary, and other partitioning is reasonable, and the partitioning may be defined in part by the volume of empirical data. In some cases, a database engine may serve to perform calculations (e.g., within, or in conjunction with a database engine query). A technique for identifying small signal event stimulus correlations in noisy response channels implemented in such systems, subsystems, and partitionings is shown in FIG. 5.

Figure 5:
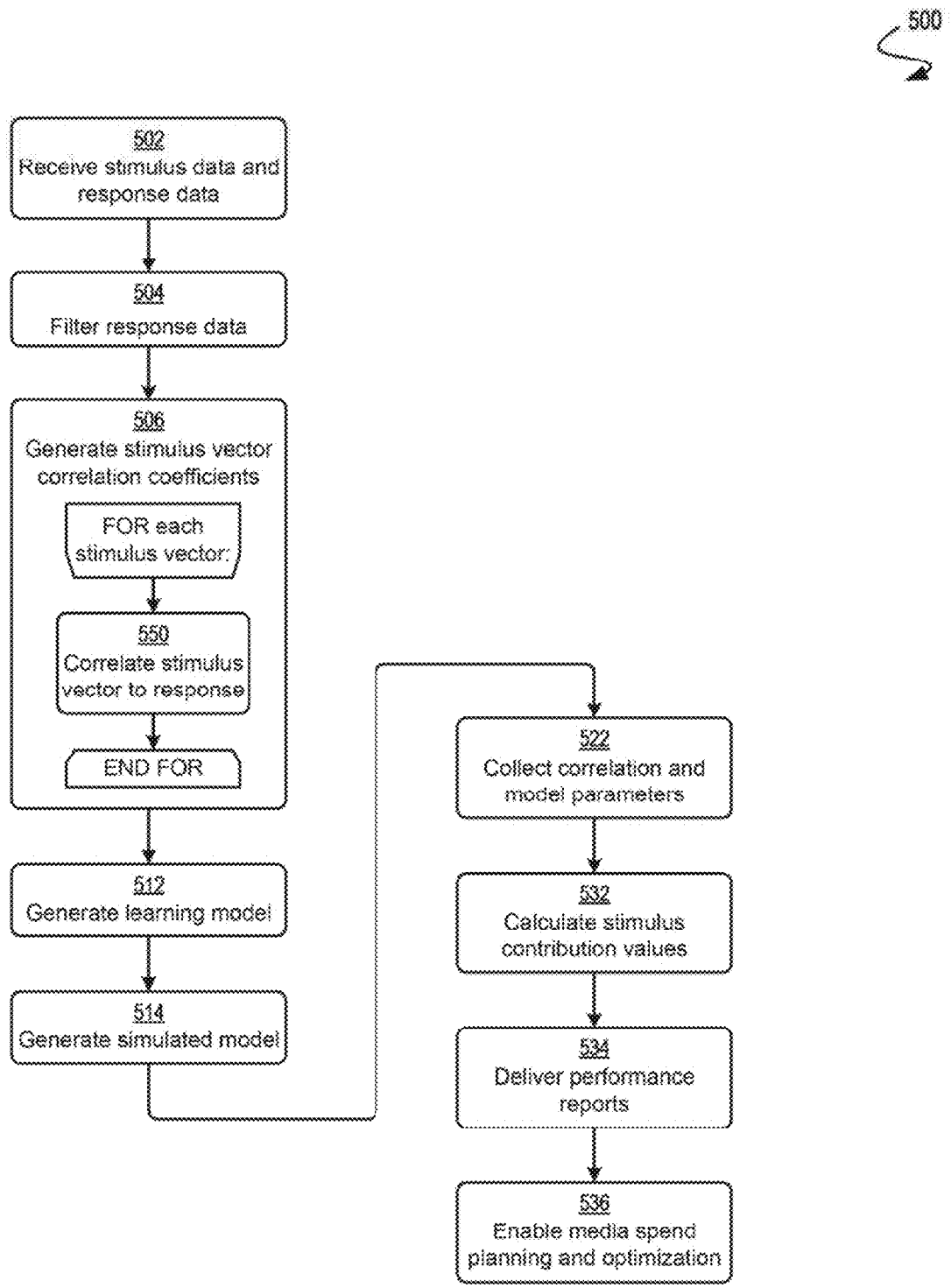
FIG. 5 is a flow chart showing steps used to identify small signal media stimulus correlations in noisy media response channels, according to some embodiments.

FIG. 5 is a flow chart 500 showing steps used to identify small signal stimulus correlations in noisy user response channels. As an option, one or more instances of flow chart 500 or any aspect thereof may be implemented in the context of the architecture and functionality of the embodiments described herein. Also, the flow chart 500 or any aspect thereof may be implemented in any desired environment.

The flow chart 500 presents one embodiment of certain steps for identifying small signal event stimulus correlations in noisy user response channels. In one or more embodiments the steps and underlying operations shown in the flow chart 500 may be executed by the measurement server 132 and apportionment server 134 disclosed herein. As shown, the flow chart 500 commences with receiving stimulus data and response data (see step 502). For example, the stimulus data may comprise a plurality of stimulus vectors. Also, the response data may comprise a plurality of response measurement vectors, a portion of which may be aggregated. The response data may be filtered (see step 504). For example, a certain portion of the response vectors comprising the response data may be included in the filtered response data based in part on geographical origin of the responses, the IP address of the respondent, the time of the response, the response channel, and/or other filter characteristics. A set of stimulus vector correlation coefficients for each stimulus vector comprising the received stimulus data may be calculated (see step 506). In one or more embodiments, step 506 may be implemented with a FOR loop comprising: (1) select a stimulus vector from the plurality of stimulus vectors in the stimulus data, (2) correlate the selected stimulus vector to the filtered response data, and (3) exit the FOR loop when all stimulus vectors have been correlated.

The flow may continue with generating a learning model (see step 512) and generating a simulated model (see step 514) as described herein. The correlation coefficients and model parameters may be collected (see step 522) and used to calculate stimulus contribution values (see step 532). Further, performance reports associated with the stimulus data, response data, stimulus correlations, and/or various campaigns and/or other data may be delivered (see step 534). Also, media spend planning and/or optimization (e.g., for a systems manager) may be enabled (see step 536).

Internet of Things System Embodiments

Figure 6:
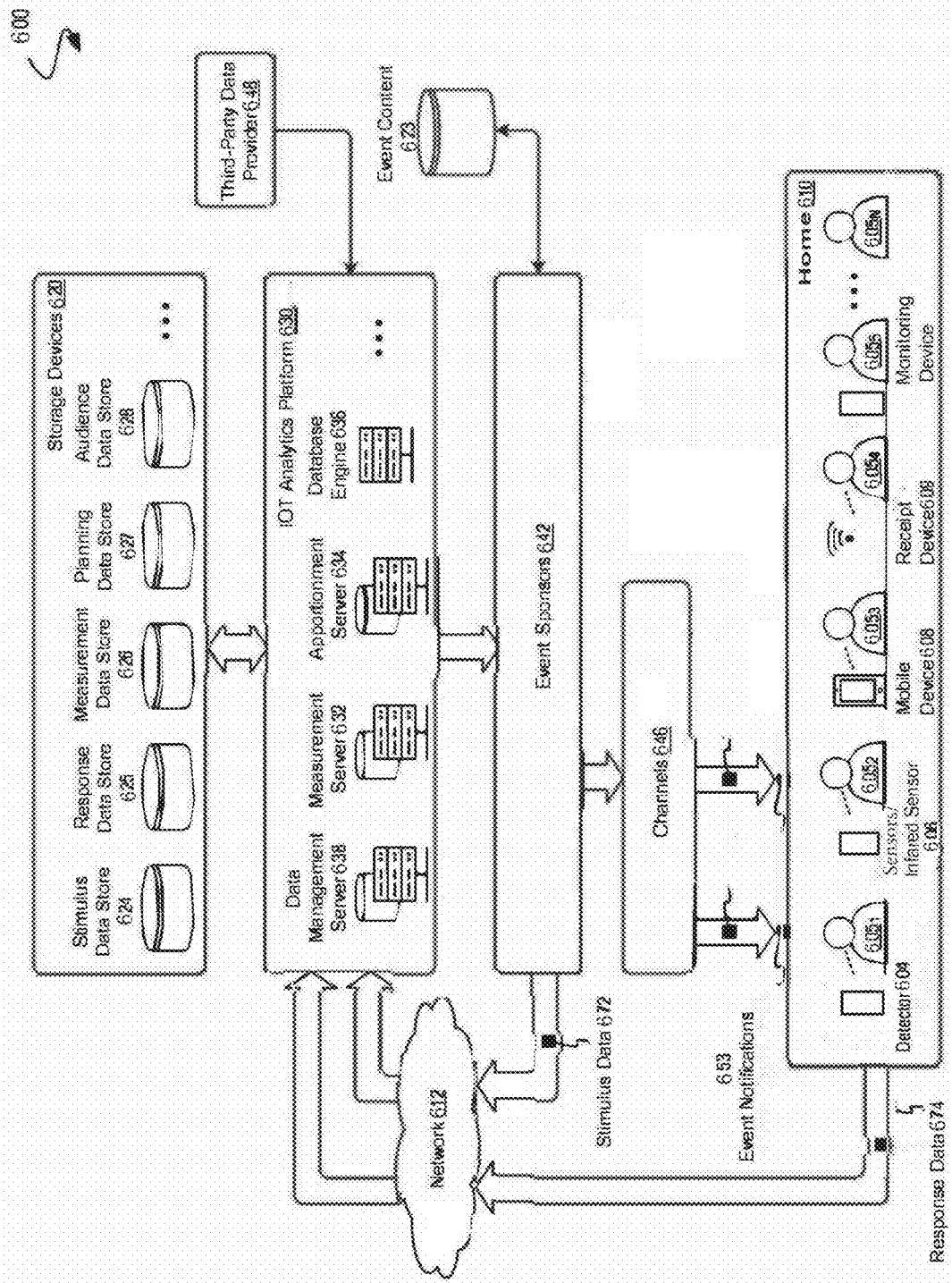
FIG. 6 depicts an environment in which embodiments of the present disclosure may operate.

FIG. 6 depicts an environment 600 in which embodiments of the present disclosure can operate. As an option, one or more instances of environment 600 or any aspect thereof may be implemented in the context of the architecture and functionality of the embodiments described herein. Also, the environment 600 or any aspect thereof may be implemented in any desired environment.

The present invention has application for systems that utilize the Internet of Things (IOT). For these embodiments, systems communicate to environments, such as a home environment, to employ event campaigns that use stimuli to effectuate desired user responses. Specifically, devices may be placed in the home to both communicate event messages or notifications as well as receive responses, either responses gathered by sensing users or by direct input to electronic devices by the users. Embodiments for implementing the present invention in such an environment are shown in FIG. 6.

The shown environment 600 depicts a set of users (e.g., user $605_1$, user $605_2$, user $605_3$, user $605_4$, user $605_5$, to user $605_N$) comprising an audience 610 that might be targeted by one or more event sponsors 642 in various event campaigns. The users may view a plurality of event notifications 653 on a reception device 609 (e.g., desktop PC, laptop PC, mobile device, wearable, television, radio, etc.). The event notifications 653 can be provided by the event sponsors 642 through any of a plurality of channels 746 in the wired environment (e.g., desktop PC, laptop PC, mobile device, wearable, television, radio, print, etc.). Stimuli from the channels 646 comprise instances of touchpoints 660 experienced by the users. As an example, a TV spot may be viewed on a certain TV station (e.g., touchpoint T1), and/or a print message (e.g., touchpoint T2) in a magazine. Further, the stimuli channels 746 might present to the users a banner ad on a mobile browser (e.g., touchpoint T3), a sponsored website (e.g., touchpoint T4), and/or an event notification in an email message (e.g., touchpoint T5). The touchpoints 660 can be described by various touchpoint attributes, such as data, time, campaign, event, geography, demographics, impressions, cost, and/or other attributes.

According to one implementation, an IOT analytics platform 630 can receive instances of stimulus data 672 (e.g., stimulus touchpoint attributes, etc.) and instances of response data 674 (e.g., response measurement attributes, etc.) via network 612, describing, in part, the measured responses of the users to the delivered stimulus (e.g., touchpoints 660). The measure responses are derived from certain user interactions as sensed in the home (e.g., detector 604, sensor/infrared sensor 606, or monitoring device 611) or transmitted by the user (e.g., mobile device 611, etc.) performed by certain users and can be described by various response attributes, such as data, time, response channel, event, geography, revenue, lifetime value, and other attributes. A third-party data provider 648 can further provide data (e.g., user behaviors, user demographics, cross-device mapping, etc.) to the IOT analytics platform 630. The collected data and any associated generated data can be stored in one or more storage devices 620 (e.g., stimulus data store 624, response data store 625, measurement data store 626, planning data store 627, audience data store 628, etc.), which are made accessible by a database engine 636 (e.g., query engine, result processing engine, etc.) to a measurement server 632 and an apportionment server 634. Operations performed by the measurement server 632 and the apportionment server 634 can vary widely by embodiment. As an example, the measurement server 632 can be used to analyze certain data records stored in the stimulus data store 624 and response data store 625 to determine various performance metrics associated with an event campaign, storing such performance metrics and related data in measurement data store 626. Further, for example, the apportionment server 634 may be used to generate event campaign plans and associated event spend apportionment, storing such information in the planning data store 627.

Marketing Attribution Embodiments

Figure 7:
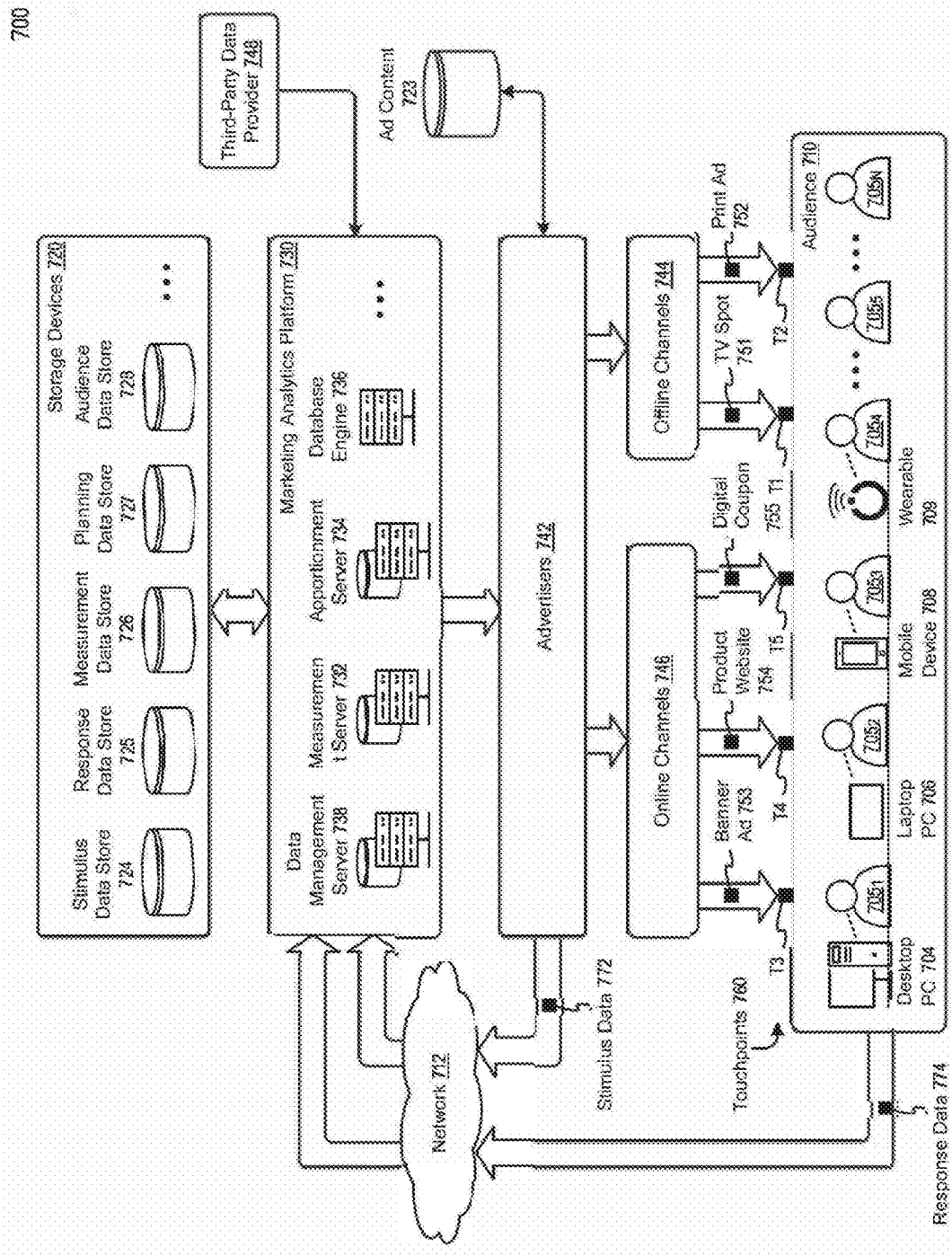
FIG. 7 depicts an environment in which embodiments of the present disclosure may operate.

FIG. 7 depicts an environment 700 in which embodiments of the present disclosure can operate. As an option, one or more instances of environment 700 or any aspect thereof may be implemented in the context of the architecture and functionality of the embodiments described herein. Also, the environment 700 or any aspect thereof may be implemented in any desired environment.

The present invention has application for marketing attribution systems. For these embodiments, marketing analytics platforms communicate to consumers to employ marketing campaigns that use stimuli (e.g., advertisements) to effectuate desired user responses, such as conversions. Embodiments for implementing the present invention in such an environment are shown in FIG. 7.

The shown environment 700 depicts a set of users (e.g., user $705_1$, user $705_2$, user $705_3$, user $705_4$, user $705_5$, to user $705_N$) comprising an audience 710 that might be targeted by one or more advertisers 742 in various marketing campaigns. The users can view a plurality of ad content 723 on a computing device (e.g., desktop PC 704, laptop PC 706, mobile device 708, wearable 709, etc. ). The plurality of ad content 723 can be provided by the advertisers 742 through any of a plurality of online channels 746 (e.g., online display, search, mobile ads, etc.) and/or a plurality of offline channels 744 (e.g., TV, radio, print, etc.). Stimuli from the online channels 746 and offline channels 744 comprise instances of touchpoints 760 experienced by the users. As an example, a TV spot 751 viewed on a certain TV station (e.g., touchpoint T1), and/or a print ad 752 (e.g., touchpoint T2) in a magazine might be delivered through the offline channels 744. Further, the online channels 746 might present to the users a banner ad 753 on a mobile browser (e.g., touchpoint T3), a product website 754 (e.g., touchpoint T4), and/or a digital coupon 755 in an email message (e.g., touchpoint T5). The touchpoints 760 can be described by various touchpoint attributes, such as data, time, campaign, product, geography, demographics, impressions, cost, and/or other attributes.

According to one implementation, a marketing analytics platform 730 can receive instances of stimulus data 772 (e.g., stimulus touchpoint attributes, etc.) and instances of response data 774 (e.g., response measurement attributes, etc. ) via network 712, describing, in part, the measured responses of the users to the delivered stimulus (e.g., touchpoints 760). The measure responses are derived from certain user interactions (e.g., call to call center, click on banner ad, purchase online, etc.) performed by certain users and can be described by various response attributes, such as data, time, response channel, product purchased, geography, revenue, lifetime value, and other attributes. A third-party data provider 748 can further provide data (e.g., user behaviors, user demographics, cross-device mapping, etc.) to the marketing analytics platform. 730. The collected data and any associated generated data can be stored in one or more storage devices 720 (e.g., stimulus data store 724, response data store 725, measurement data store 726, planning data store 727, audience data store 728, etc.), which are made accessible by a database engine 736 (e.g., query engine, result processing engine, etc.) to a measurement server 732 and an apportionment server 734. Operations performed by the measurement server 732 and the apportionment server 734 can vary widely by embodiment. As an example, the measurement server 732 can be used to analyze certain data records stored in the stimulus data store 724 and response data store 725 to determine various performance metrics associated with a marketing campaign, storing such performance metrics and related data in measurement data store 726. Further, for example, the apportionment server 734 can be used to generate marketing campaign plans and associated marketing spend apportionment, storing such information in the planning data store 727.

Various techniques for calculating such performance metrics and spend apportioning have been considered. However, in "noisy" media response channels that might include an aggregate response from multiple marketing campaigns and media stimuli, legacy approaches have limitations. For example, user $705_1$ in environment 700 might experience all of the touchpoints 760 and then transition from a first engagement state (e.g., no product interest) to a second engagement state (e.g., conversion, such as a product purchase). Legacy approaches might be able to measure the influence (e.g., contribution value) of certain stimuli on the conversion of user $705_1$ at a channel level (e.g., TV, radio, print, search, etc.), yet not discern the attribution at a more granular sub-channel level. For example, a legacy approach, might not identify the TV spot. 751 as the leading contributor to the conversion of user $705_1$. The herein disclosed systems and techniques address such limitations associated with legacy approaches. One embodiment of such systems was described above in conjunction with FIG. 1.

Figure 8:
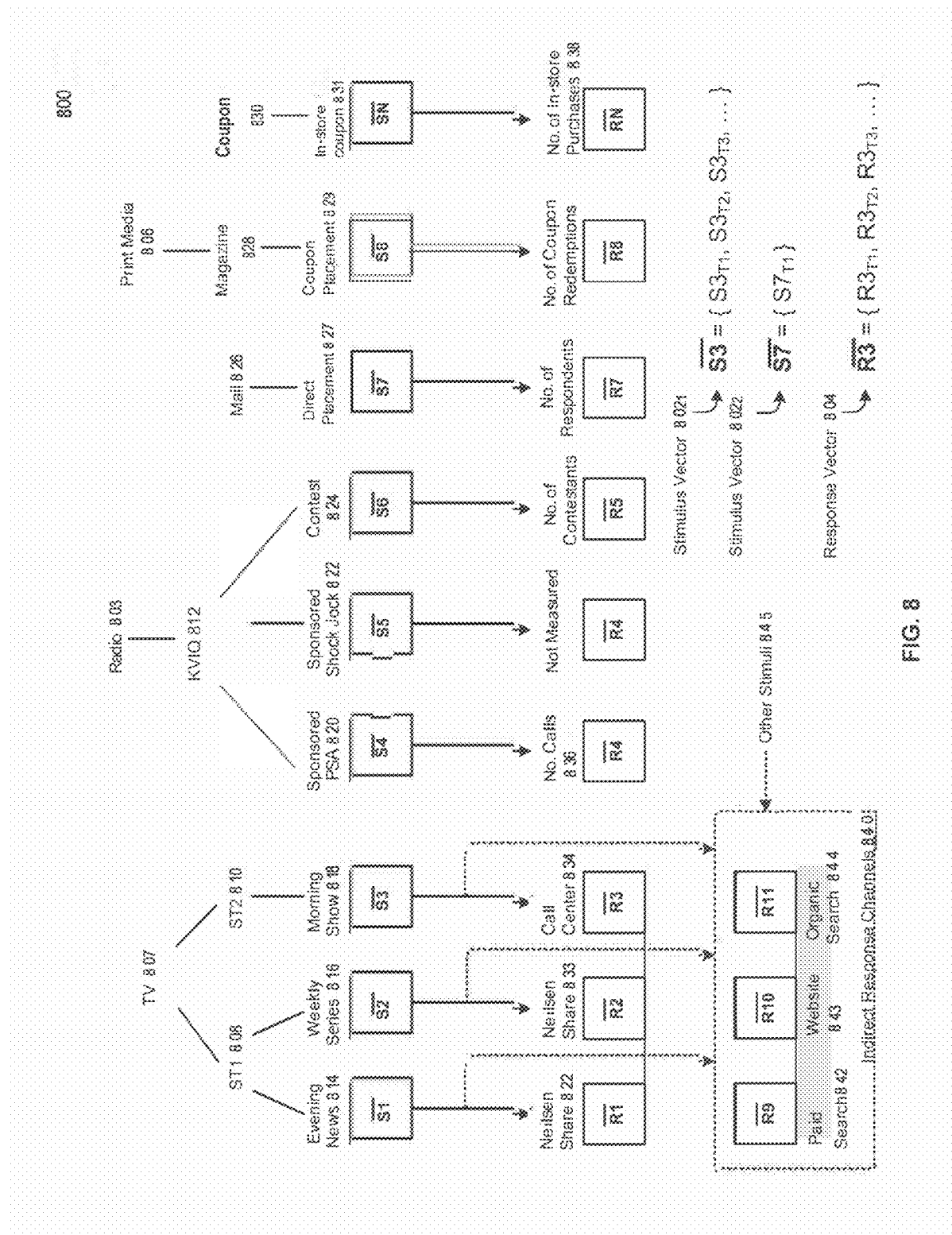
FIG. 8 is a portfolio schematic showing multiple media stimulus channels and response channels in environments for implementing techniques for identifying small signal media stimulus correlations in noisy media response channels, according to some embodiments.

FIG. 8 is a portfolio schematic 2A00 showing multiple media stimulus channels and response channels in environments for implementing techniques for identifying small signal media stimulus correlations in noisy media response channels. As an option, one or more instances of portfolio schematic 800 or any aspect thereof may be implemented in the context of the architecture and functionality of the embodiments described herein. Also, the portfolio schematic 800 or any aspect thereof may be implemented in any desired environment.

As shown, the portfolio schematic 800 includes three types of media channels, namely TV 807, radio 803, and print media 206. Under each media channel are shown one or more sub-channel spends. TV 807 spends comprise stations named ST1 808 and ST2 810. Radio 803 spends comprise a station named KVIQ 812. Print media 806 spends comprise distribution through mail 826, magazine 828, and printed coupon 830. More specifically, the media portfolio includes spends for TV 807 during the evening news 814, weekly series 816, and morning show 818. The media portfolio also includes radio 803 spends in the form of a sponsored public service announcement 820, a sponsored shock jock spot 822, and a contest 824. The media portfolio also includes print media 806 spends for a direct mailer 827, a coupon placement 829, and an in-store coupon 831, as shown. The stimuli comprising such spends can be viewed in more detail. For example, the spends for TV 807 on station ST1 808 during the evening news 814 can comprise certain airings characterized by a timestamp, a duration, a placement (e.g., spot, show playing, etc.), a creative, and/or other characteristics. In some cases, the marketing manager might want to know a particular airing that most influenced a particular response.

As depicted in FIG. 8, for each media channel and sub-channel, there is one or more stimuli (e.g., $\overline{S1}$, $\overline{S2}$, $\overline{S3}$, to $\overline{SN}$) and a respective measured response (e.g., $\overline{R1}$, $\overline{R2}$, $\overline{R3}$, to $\overline{RN}$). As shown, there can be a one-to-one correspondence between a particular stimulus and its response. For example, the TV 807 evening news 814 spot is depicted with stimulus $\overline{S1}$, and has an associated response $\overline{R1}$ (e.g., using a Nielsen share 832 metric). Also, response $\overline{R1}$ is measured by calls to a call center 834, response $\overline{R4}$ is measured by a number of calls 836, and response $\overline{RN}$ is measured by a number of in-store purchases 838.

In some cases, certain sets of indirect response channels 840 can be associated with certain stimuli. For example, the response channels $\overline{R9}$, $\overline{R10}$, and $\overline{R11}$ (e.g., paid search 842, website 843, organic search 844, respectively) comprising the indirect response channels 840 might be associated with the campaign and spend using the TV 807 channel. In this case, the response data from the indirect response channels 840 might be available (e.g., as response data 174) in aggregate, and/or include the influence of instances of other stimuli 845 (e.g., not from TV 807).

The stimuli and responses discussed herein are often formed as a sequential time-series (e.g., sequences) of data items (e.g., attributes, values, measurements) representing various stimulus instances (e.g., touchpoints) and various response instances, respectively. An exemplary embodiment of data structures used for such stimulus touchpoint attribute sequences and response measurement attribute sequences is described in FIG. 9. For notational convenience, such temporal signals can be represented as stimulus vectors, such as the stimulus vector $802_1$ (e.g., corresponding to instances in time of stimulus $\overline{S3}$), the stimulus vector $802_2$ (e.g., corresponding to instances in time of stimulus $\overline{S7}$), and the response vector 804 (e.g., corresponding to instances in time of response $\overline{R3}$). As shown, a stimulus or response vector can have many data items (e.g., stimulus vector $802_1$ comprising multiple airings on the evening news 814), or could have as few as one data item (e.g., stimulus vector $802_2$ comprising a single event corresponding to the direct mailer 827), In some cases, the time interval and/or time stamp of certain stimuli and certain responses can be the same, such as shown in FIG. 8 (e.g., times T1, T2, T3, etc.). In other cases, the time interval and/or timestamp of certain stimuli and certain responses can be different. Further, the time-series can be presented in a native time unit (e.g., weekly, daily) and can be apportioned over a different time unit. For example, stimulus S3 corresponds to a weekly spend for the "Morning Show", even though the stimulus to be considered actually occurs daily (e.g., during the "Morning Show"). The weekly stimulus spend can be apportioned to a daily stimulus occurrence. In some situations, the time unit in a time-series can be granular (e.g., minutes, seconds). When the interval is short, (e.g., seconds or minutes) for a given vector or collection of vectors, a visualization plot of the vector or vectors over time can appear as a continuous signal. Apportioning over time periods or time units can be performed using any known techniques. Vectors (e.g., instances of stimulus vectors, instances of response vectors, etc.) can be formed from any time-series in any time units and can be apportioned to another time-series using any other time units.

FIG. 9 is a diagram 600 depicting data structures used in systems for identifying small signal media stimulus correlations in noisy media response channels. As an option, one or more instances of diagram 900 or any aspect thereof may be implemented in the context of the architecture and functionality of the embodiments described herein. Also, the diagram 900 or any aspect thereof may be implemented in any desired environment.

As discussed herein, certain stimulus data (e.g., stimulus data 172) and certain response data (e.g., response data 174) may be used in the disclosed techniques and systems for identifying small signal media stimulus correlations in noisy media response channels. The diagram 900 depicts exemplary examples of structures for organizing, storing, accessing, analyzing, transmitting, or otherwise using such stimulus data and response data. Specifically shown are a stimulus data structure 910 and a response data structure 920. The stimulus data structure 910 is represented in diagram 900 as a table with rows corresponding to a stimulus vector and/or a data item (e.g., touchpoint, TV spot airing event) included in a stimulus vector, and columns corresponding to attributes associated with the vectors and/or events. Specifically, the rows in stimulus data structure 910 may comprise certain instances of stimulus touchpoint attribute sequences 912 (e.g., comprising one or more stimulus vectors). For example, the first row shown in the stimulus data structure 910 corresponds to a 30-second "Creative 1" (e.g., commercial for "Product 1") for "Campaign 1" placed on "ABC" on "Sep. 28, 2013". The timestamp for the spot is described as "at least up to the minute" of "11:56:02" since an exact air time might not be guaranteed. The stimulus data structure 910 further captures a geography (e.g., Nielsen designated market area or DMA), a demography (e.g., "Females 18-55") and various impression metrics for the vector data item. For example, the impression data in the foregoing example indicate that 1,234,567 impressions (e.g., individual and/or audience views) were served and the associated cost was $10,000. Other stimulus vectors and/or data items are shown and/or are possible in the stimulus data structure 910.

The response data structure 920 is represented in diagram 900 as a table with rows corresponding to a response vector and/or a data item (e.g., paid search response) included in a response vector, and columns corresponding to attributes associated with the vectors and/or events. Specifically, the rows in response data structure 920 may comprise certain instances of response measurement attribute sequences 922 (e.g., comprising one or more response vectors). For example, the second row shown in the response data structure 920 corresponds to a "Paid Search" response using "Keyword 1" that resulted in a purchase of "Product 2" on "Sep. 28, 2013". The timestamp for the response is described as "at least up to the minute" of "11:57:30" since an exact search time might not be recorded. The response data structure 920 further captures a geography (e.g., Nielsen DMA) and various response metrics for the vector data item. For example, the response data in the foregoing example indicate that $35.60 in revenue was generated from the response, and a lifetime value (LTV) of $1,256 was attributed to the respondent. Other key performance indicators may be included in the response data structure 920, such as site (e.g., URL) visits, content "likes", text messages, and other indicators. Other response vectors and/or data items are shown and/or are possible in the response data structure 920.

The herein disclosed techniques may be applied to stimulus data and response data organized in the stimulus data structure 910 and the response data structure 920, respectively, to identify small signal media stimulus correlations in noisy media response channels. Further, the small signal media stimulus correlations and other information derived from the data structures in diagram 900 may be used to calculate the influence (e.g., contribution value) a given stimulus vector has on a given response (e.g., conversion). One embodiment of such stimulus attribution results is shown in FIG. 10.

Figure 10:
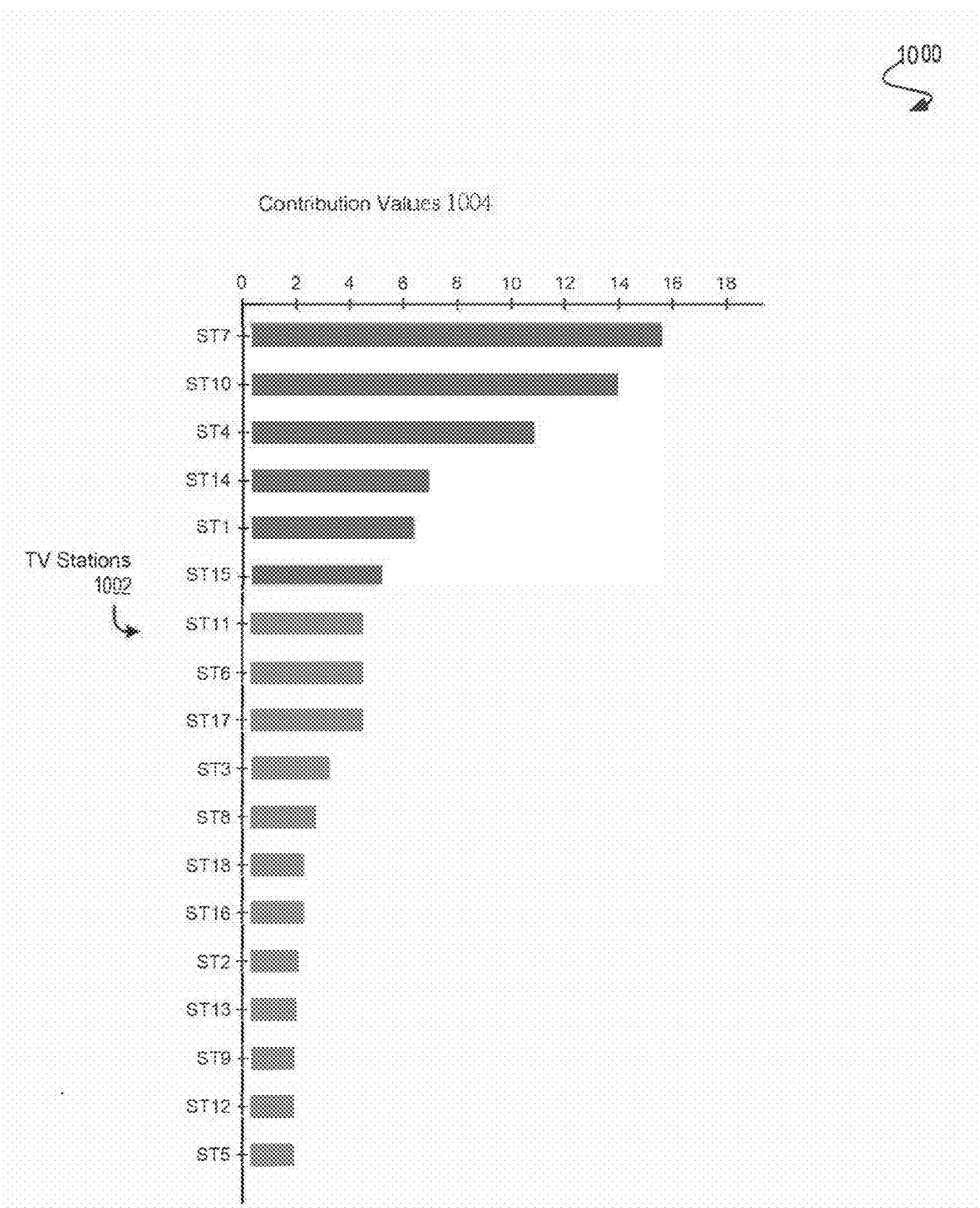
FIG. 10 is a TV station attribution chart produced by systems that identify small signal media stimulus correlations in noisy media response channels, according to some embodiments.

FIG. 10 is a TV station attribution chart 1000 produced by systems that identify small signal media stimulus correlations in noisy media response channels. As an option, one or more instances of TV station attribution chart 1000 or any aspect thereof may be implemented in the context of the architecture and functionality of the embodiments described herein. Also, the TV station attribution chart 1000 or any aspect thereof may be implemented in any desired environment.

The TV station attribution chart 1000 is merely one example of attribution calculations enabled, in part, by the herein disclosed techniques for identifying small signal media stimulus correlations in noisy media response channels. Specifically, the TV station attribution chart 1000 illustrates the contribution values 1004 corresponding to one or more stimulus vectors on each of the TV stations 1002. Such sub-channel attribution in noisy response channels, such as those associated with TV marketing, is enabled, in part, by the herein disclosed techniques. For example, the contribution values 1004 might correspond to the magnitude of the correlation coefficient generated by the herein disclosed techniques for each of the TV stations 1002, such correlation coefficients measuring the influence a certain spot or sequence of spots airing on a given station had on the purchase of a product.

As shown in the example of FIG. 10, the contribution values range from 0 to nearly 16, and might represent an attribution ratio measurement. For example, one such ratio measurement compares the baseline conversion rate in a given segment to the conversion rate attributed to a given stimulus. Other attribution and related metrics are possible. For example, the stimulus media spend in the stimulus data structure 910, and/or the response revenue and/or LTV included in the response data structure 920, may be used to calculate other performance metrics, such as cost per acquisition (CPA), and other performance metrics. Such metrics may be used (e.g., by a marketing manager) to plan and/or optimize media campaigns and media spend allocations. User interfaces for performing such tasks are discussed in FIG. 11A and FIG. 11B.

Figure 11A:
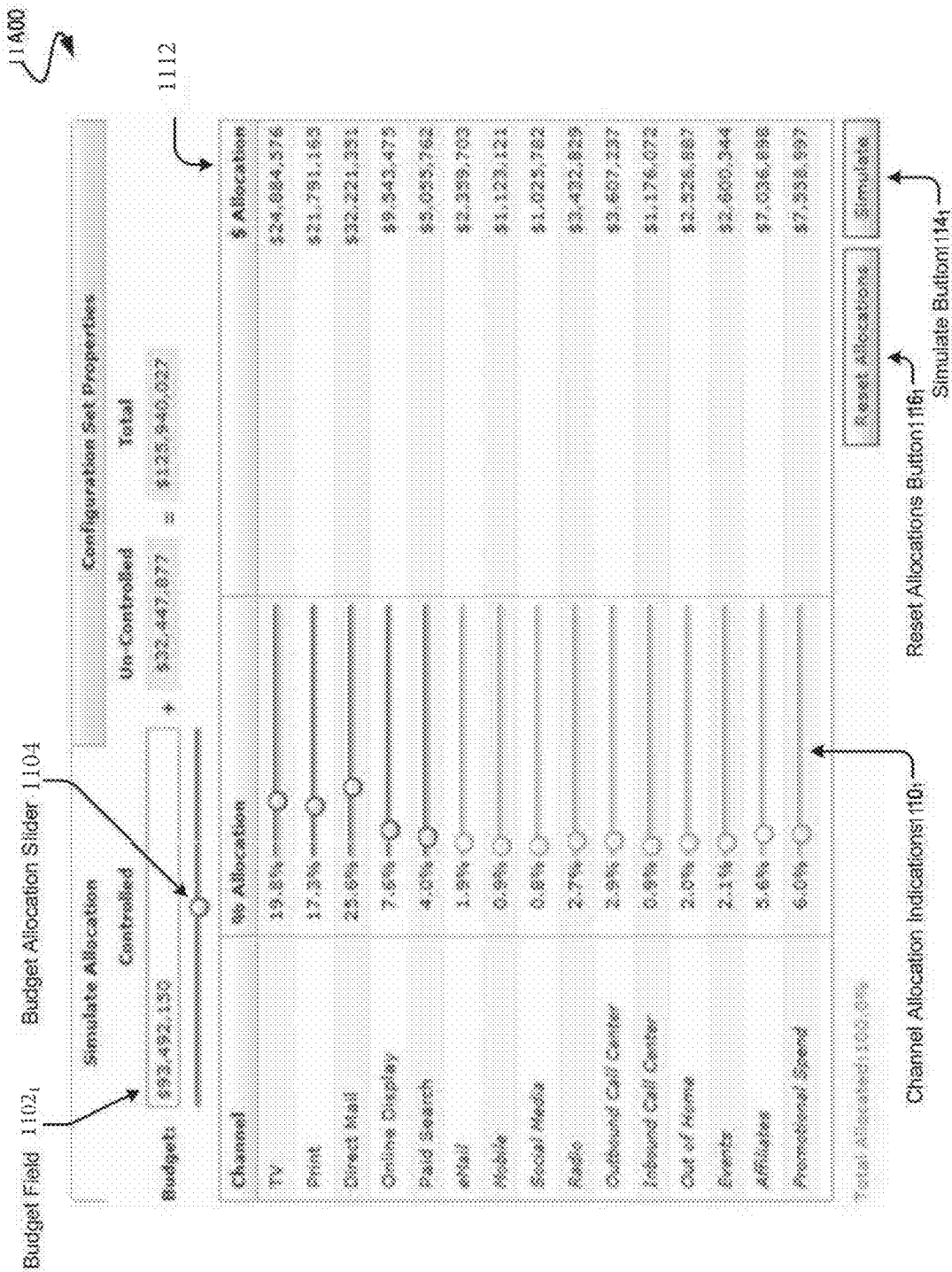
FIG. 11A shows a user interface for establishing channel level allocation of media spend in systems implementing techniques for identifying small signal media stimulus correlations in noisy media response channels, according to some embodiments.

FIG. 11A shows a user interface 1100 for establishing channel level allocation of media spend in systems implementing techniques for identifying small signal media stimulus correlations in noisy media response channels. As an option, one or more instances of user interface 1100 or any aspect thereof may be implemented in the context of the architecture and functionality of the embodiments described herein. Also, the user interface 1100 or any aspect thereof may be implemented in any desired environment.

The user interface 1100 may be invoked to show default conditions and/or to show the apportionments across the channels of a given marketing campaign and/or media portfolio that corresponds to stimulus attribution calculations enabled, in part, by the herein disclosed techniques. By interacting with the user interface 1100 a marketing manager (or any user) may reapportion spending over the channels in the media portfolio and view the results (e.g., using simulation, etc.) of such, reapportioning in real time. Specifically, and as shown, a marketing manager may enter a budget amount using a budget field $1102_1$ or by using a budget allocation slider 1104. A default value for a budget may be determined via a calculation that chooses a mid-point between a user-defined minimum budget and user-define maximum budget. Such user-defined budget points may be defined in a different, interface view (e.g., the "Configuration Set Properties" tab). In some cases, the budget might be "unknown". In such a case, a default budget is determined. One approach to determining a default budget (e.g., a minimum budget) is to iterate to sum all of the minimum spend values as givers through the entire portfolio, and use that value.

Responsive to a change in the budget amount, the system displays an allocation. The allocation may be displayed as a percent of the budget (e.g., using sliders or other display components to show an arrangement of channel allocation indications $1110_1$), or the allocation may be displayed in the units of the budget (e.g., in dollars, as shown in column 1112). When allocations are established, the marketing manager may invoke activities that emulate and/or perform a simulation by clicking a simulate button $1114_1$. Such activities serve to determine or predict the effect that the selected allocations might have on the response of the media portfolio. In some cases, a user might want to return the selected channel allocations to the default and/or recommended apportionment. In such a case, the user may interact with a display component to reset allocation (e.g., using reset allocations button $1116_1$). Any of a variety of known-in-the art. techniques may be used to prevent unwanted overwriting of user values may be employed during user interaction.

Sample Use Model

A use case proceeds a follows:

A user clicks on the reset allocations button $1116_1$ to reset the displayed values to depict values corresponding to stimulus attribution calculations enabled, in part, by the herein disclosed techniques.

A user clicks on the simulate button $1114_1$. That action initiates activities to determine response metric numbers for the combination of the total budget and channel allocations as specified by the user. If the total of all channel allocations do not sum up to 100%, the user is prompted to further reapportion spending percentages to reach 100%. The channel allocations may be reapportioned to total 100% using any known technique.

A user interacts with one or more channel allocation indications $1110_1$ (e.g., using the per-channel allocation sliders). The shown interface supports channel allocation indications to be set to a value between the minimum budget and the maximum budget as defined in the configuration set.

As shown in the channel allocation indications $1110_1$ of the user interface 1100, media spend allocations may be adjusted at the channel level (e.g., TV, Print Direct Mail, etc.). In some cases, the marketing manager desires to allocate spending at a more granular level. For example, for the marketing manager might want to further optimize the 19.8% of spend in the TV channel to specific stations and/or specific spots (e.g., airings, etc.). The herein disclosed techniques enable attributions at a sub-channel level by identifying small signal media stimulus correlations in noisy media response channels (e.g., TV). Such correlations and attributions may then be used to enable media spend apportioning as shown in FIG. 11B.

Figure 11B:
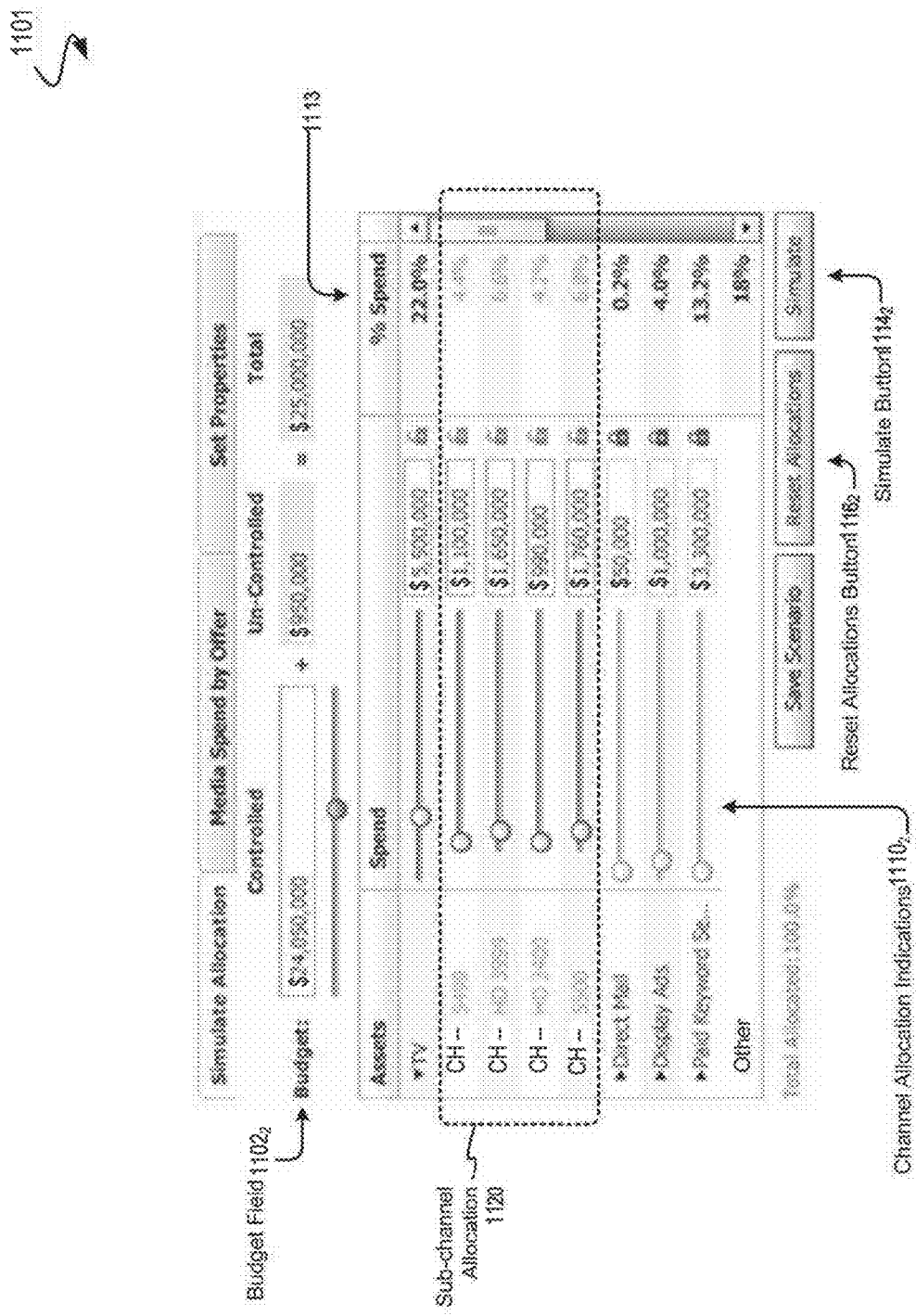
FIG. 11B shows a user interface for sub-channel level allocation of media spend based on small signal media stimulus correlations in noisy media response channels, according to some embodiments.

FIG. 11B shows a user interface 1101 for sub-channel level allocation of media spend based on small signal media stimulus correlations in noisy media response channels. As an option, one or more instances of user interface 1101 or any aspect thereof may be implemented in the context of the architecture and functionality of the embodiments described herein. Also, the user interface 1101 or any aspect thereof may be implemented in any desired environment.

The user interface 1100 shown in FIG. 11B comprises interface components described in FIG. 11A. Specifically, instances of a budget field $1102_2$, channel allocation indicators $1110_2$, a reset allocations button $1116_2$, and a simulate button $1114_2$ are shown. As presented by the channel allocation indications $1110_2$ and specified in a "% Spend" column 1113, certain allocations have been selected at the channel level (e.g., TV=22.0%, Direct Mail=0.2%, Display Ads=4.0%, Paid Keyword Search=13.2%, and Other=18%). As described herein, the marketing manager may further use the user interface 1101 to select certain instances of sub-channel allocation 1120. Specifically, the herein disclosed techniques may enable stimulus-response correlation and attribution at a sub-channel level (e.g., stimulus vector level, stimulus vector event level, stimulus vector data item level, etc.) stimulus such that media spend allocation scenarios may be simulated and planned. For example, as shown, the marketing manager may allocate the TV media spend to specific stations (e.g., CH 5499, CH HD 3999, CH HD 3400, CH 5500) based in part on the attribution resulting from conflations of the small signal media stimulus associated with such stations to the response data received from noisy media response channels.

Additional System Architecture Examples

Figure 12A:
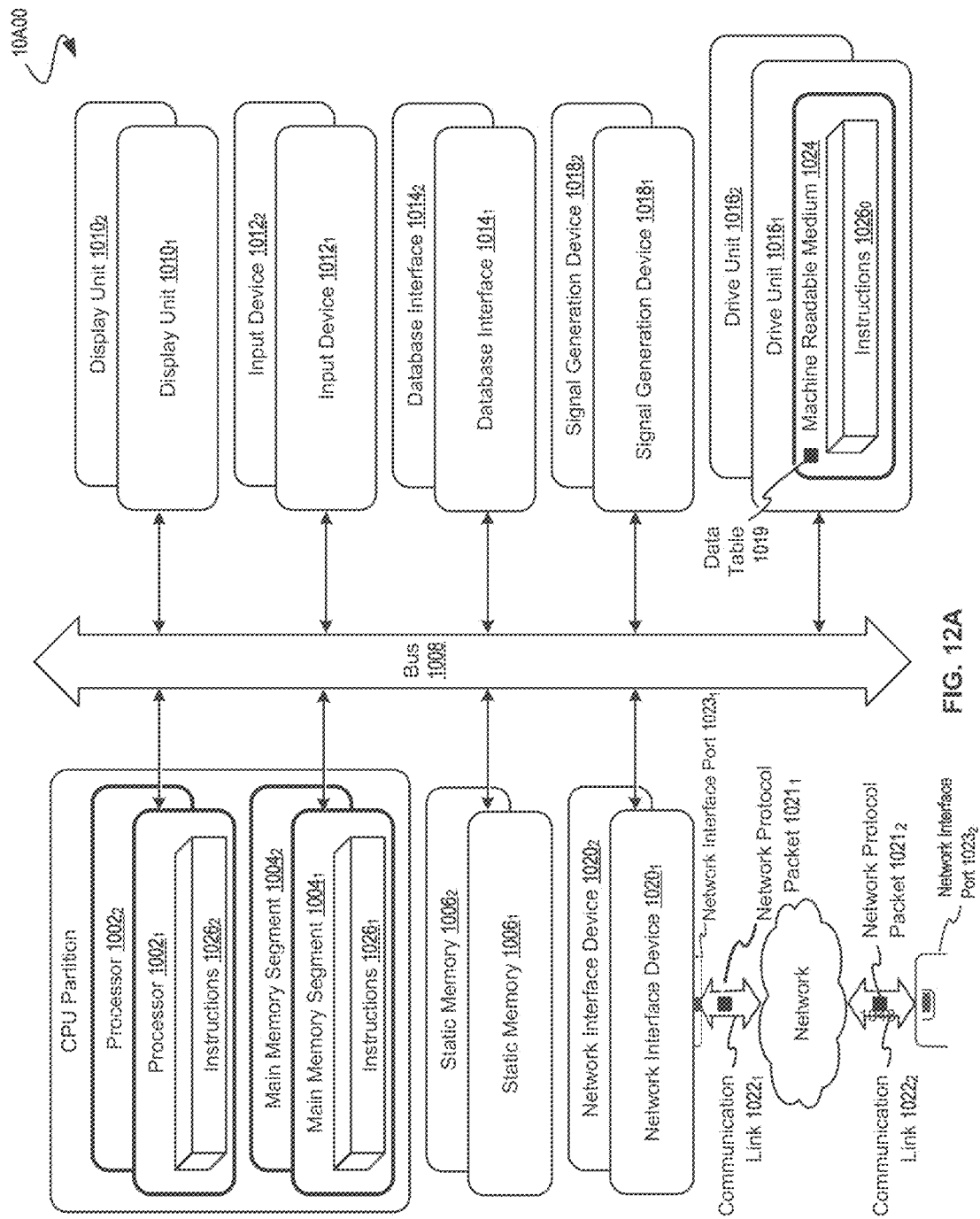
FIG. 12A and FIG. 12B depict block diagrams of computer system components suitable for implementing embodiments of the present disclosure.

FIG. 12A depicts a diagrammatic representation of a machine in the exemplary form of a computer system 10A00 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 10A00 includes one or more processors (e.g., processor $1002_1$, processor $1002_2$, etc.), a main, memory comprising one or more main memory segments (e.g., main memory segment $1004_1$, main memory segment $1004_2$, etc.), one or more static memories (e.g., static memory $1006_1$, static memory $1006_2$, etc.), which communicate with each other via a bus 1008. The computer system 10A00 may further include one or more video display units (e.g., display unit $1010_1$, display unit $1010_2$, etc.), such as an LED display, or a liquid crystal display (LCD), or a cathode ray tube (CRT). The computer system 10A00 may also include one or more input devices (e.g., input device $1012_1$, input device $1012_2$, alphanumeric input device, keyboard, pointing device, mouse, etc.), one or more database interfaces (e.g., database interface 1014 database interface $1014_2$, etc.), one or more disk drive units (e.g., drive unit $1016_1$, drive unit $1016_2$, etc. ), one or more signal generation devices (e.g., signal generation device $1018_1$, signal generation device $1018_2$, etc.), and one or more network interface devices (e.g., network interface device $1020_1$, network interface device $1020_2$, etc.).

The disk drive units may include one or more instances of a machine-readable medium 1024 on which is stored one or more instances of a data table 1019 to store electronic information records. The machine-readable medium 1024 may further store a set. of instructions $1026_0$ (e.g., software) embodying any one, or all, of the methodologies described above. A set of instructions $1026_1$ may also be stored within the main memory (e.g., in main memory segment $1004_1$). Further, a set of instructions $1026_2$ may also be stored within the one or more processors (e.g., processor $1002_1$). Such instructions and/or electronic information may further be transmitted or received via the network interface devices. Specifically, the network interface devices may communicate electronic information across a network using one or more communication links (e.g., communication link $1022_1$, communication link $1022_2$, etc.). One or more network protocol packets (e.g., network protocol packet $1021_1$, network protocol packet $1021_2$, etc. ) may be used to hold the electronic information (e.g., electronic data records) for transmission across the network.

The computer system 10A00 may be used to implement a client system and/or a server system, and/or any portion of network infrastructure. Further, it is to be understood that various embodiments may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM), random access memory (RAM); magnetic disk storage media; optical storage media; flash memory devices; or any other type of non-transitory media suitable for storing or transmitting information.

A module as used herein may be implemented using any mix of any portions of the system memory, and any extent of hard-wired circuitry including hard-wired circuitry embodied as one or more processors (e.g., processor $1002_1$, processor $1002_2$, etc.).

Figure 12B:
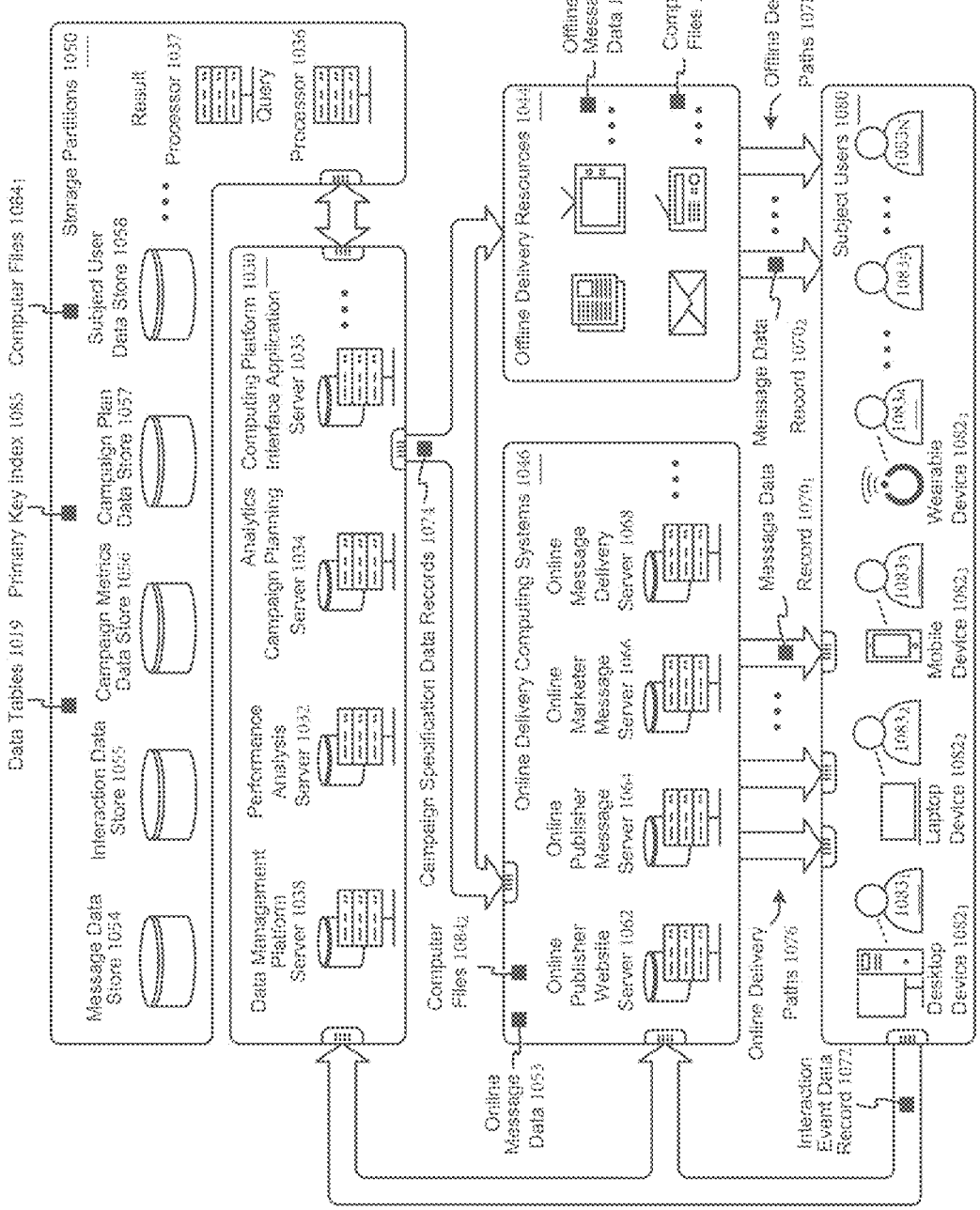

FIG. 12B depicts a block diagram of a data processing system suitable for implementing instances of the herein-disclosed embodiments. The data processing system may include many more or fewer components than those shown.

The components of the data processing system may communicate electronic information (e.g., electronic data records) across various instances and/or types of an electronic communications network (e.g., network 1048) using one or more optical links, Ethernet links, wireline links, wireless links, and/or other electronic communication links (e.g., communication link $1022_3$, communication link $1022_4$, etc.). Such communication links may further use supporting hardware, such as modems, bridges, routers, switches, wireless antennas and towers, and/or other supporting hardware. In some embodiments, the network 1048 may include, without limitation, the web (i.e., the Internet), one or more local area networks (LANs), one or more wide area networks (WANs), one or more wireless networks, and/or one or more cellular networks. The various communication links transmit signals comprising data and commands (e.g., electronic data records) exchanged by the components of the data processing system, as well as any supporting hardware devices used to transmit the signals. In some embodiments, such signals are transmitted and received by the components at one or more network interface ports (e.g., network interface port $1023_1$, network interface port $1023_2$, etc.). In one or more embodiments, one or more network protocol packets (e.g., network protocol packet $1021_3$, network protocol packet $1021_4$, etc.) may be used to hold the electronic information comprising the signals.

As shown, the data processing system may be used by one or more advertisers to target a set of users (e.g., user $1083_1$, user $1083_2$, user $1083_3$, user $1083_4$, user $1083_5$, to user $1083_N$) comprising an audience 1080 in various marketing campaigns. The data processing system may further be used to determine, by a computing platform 1030, various attributes of such marketing campaigns. Other operations, transactions, and/or activities associated with the data processing system are possible. Specifically, the users in audience 1080 may experience a plurality of online content 1053 transmitted through any of a plurality of online channels 1076 (e.g., online display, search, mobile ads, etc.) to various computing devices (e.g., desktop device $1082_1$, laptop device $1082_2$, mobile device $1082_3$, and wearable device $1082_4$). The users in audience 1080 may further experience a plurality of offline content 1052 presented through any of a plurality of offline channels 1078 (e.g., TV, radio, print, direct mail, etc.). The online content 1053 and/or the offline content 1052 may be selected for deliver)/ to the audience 1080 based in part on certain instances of campaign specification data records 1074 (e.g., established by the advertisers and/or the computing platform 1030). For example, the campaign specification data records 1074 might comprise settings, rules, taxonomies, and other information transmitted electronically to one or more instances of online delivery computing systems 1046 and/or one or more instances of offline delivery resources 1044. The online delivery computing systems 1046 and/or the offline delivery resources 1044 may receive and store such electronic information in the form of instances of computer files $1084_2$ and computer files $1084_3$, respectively. In one or more embodiments, the online delivery computing systems 1046 may comprise computing resources such as a publisher web server 1062, a publisher ad server 1064, a marketer ad server 1066, a content delivery server 1068, and other computing resources. For example, the stimulus data record $1070_1$; presented to the users of audience 1080 through the online channels 1076 may be transmitted through the communications links of the data processing system as instances of electronic data records using various protocols (e.g., HTTP, HTTPS, etc.) and structures (e.g., JSON), and rendered on the computing devices in various forms (e.g., digital picture, hyperlink, advertising tag, text message, email message, etc.). The stimulus data record $1070_2$ presented to the users of audience 1080 through, the offline channels 1078 may be transmitted as sensory signals in various forms (e.g., printed pictures and text, video, audio, etc.).

The computing platform 1030 may receive instances of response data record 1072 comprising certain characteristics and attributes of the response of the users in audience 1080 to the stimulus data record $1070_1$ and the stimulus data record $10702_2$. For example, the response data record 1072 may describe certain online actions taken by the users on the computing devices, such as visiting a certain URL, clicking a certain link, loading a web page that fires a certain advertising tag, completing an online purchase, and other actions. The response data record 1072 may also include information pertaining to certain offline actions taken by the users, such as a purchasing a product in a retail store, using a printed coupon, dialing a toll-free number, and other actions. The response data record 1072 may be transmitted to the computing platform 1030 across the communications links as instances of electronic data records using various protocols and structures. The response data record 1072 may further comprise data (e.g., computing device identifiers, timestamps, IP addresses, etc.) related to the users' actions.

The response data record 1072 and other data generated and used by the computing platform 1030 may be stored in one or more storage devices 1050 (e.g., stimulus data store 1054, response data store 1055, measurement data store 1056, planning data store 1057, audience data store 1058, etc.). The storage devices 1050 may comprise one or more databases and/or other types of non-volatile storage facilities to store data in various formats and structures (e.g., data tables 1082, computer files $1084_1$, etc.). The data stored in the storage devices 1050 may be made accessible to the computing platform by a query engine 1036 and a result processor 1037, which may use various means for accessing and presenting the data, such as a primary key index 1083 and/or other means. In one or more embodiments, the computing platform 1030 may comprise a measurement server 1032 and an apportionment, server 1034, Operations performed by the measurement server 1032 and the apportionment server 1034 may vary widely by embodiment. As an example, the measurement server 1032 may be used to analyze the stimuli presented to the users (e.g., stimulus data record 10701 and stimulus data record $1070_2$) and the associated instances of response data record 1072 to determine various performance metrics associated with a marketing campaign, which metrics may be stored in the measurement data store 1056 and/or used to generate various instances of the campaign specification data records 1074. Further, for example, the apportionment server 1034 may be used to generate marketing campaign plans and associated marketing spend apportionment, which information may be stored in the planning data store 1057 and/or used to generate various instances of the campaign specification data records 1074. Certain portions of the response data record .1072 might further be used by a data management server 1038 in the computing platform 1030 to determine various user attributes (e.g., behaviors, intent, demographics, device usage, etc.), which attributes may be stored in the audience data store 1058 and/or used to generate various instances of the campaign specification data records 1074.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A computer-implemented method for using machine-learning techniques to present a user interface with campaign spend allocations based on attribution of small signal stimulus in noisy response channels, the method comprising:

generating, in a computer, from stimuli data associated with at least one channel, a plurality of time series stimuli data vectors from event notifications for an event propagated through a channel over a period of time to a plurality of users, the event notifications being associated with a plurality of small signal attributes specified at a sub-channel level of the channel;

generating, from aggregated response data associated with the event and including a plurality of user responses to the event, a plurality of time series response data vectors from responses elicited over time;

generating, using machine-learning techniques in a computer, a small signal correlation engine, to correlate at least one of the time series stimuli data vectors to one of the time series response data vectors, and generate a plurality of correlation coefficients that correlate the event notifications to the aggregated response data;

generating, using machine-learning techniques in a computer, a learning model to simulate variations of the stimuli data based on stimuli and aggregated response data to predict user responses using the correlation coefficients, including computing a contribution value of at least one of the plurality of small signal attributes of at least one of the event notifications;

updating the learning model based on a comparison of the predicted user responses to actual user responses to the event;

generating a media spend allocation for the channel and at least one of a sub-channel associated with the channel or another channel based on the contributions of the event notifications associated with the channel and the at least one of the sub-channel associated with the channel or the other channel and a budget received via a user interface;

displaying the media spend allocation to a user via the user interface;

simulating an effect of an adjustment to the media spend allocation, received via the user interface, based on the predicted user responses simulated by the learning model; and presenting, via the user interface, the adjusted media spend allocation and predicted user response activity based on the adjustment determined by the simulating.

2. The computer implemented method as set forth in claim 1, further including filtering the aggregated response data with a transfer function, h(n), that includes a first portion of the response data vectors and excludes a second portion of the response data vectors.

3. The computer implemented method as set forth in claim 2, wherein the transfer function, h(n), is based on a geographical origin of the responses, the IP address of the users, a response time, or a response channel.

4. The computer-implemented method as set forth in claim 1, wherein generating, using machine-learning techniques in a computer, a small signal correlation engine in accordance with the expression:

$$r = \frac{n\sum xy - (\sum x)(\sum y)}{\sqrt{n(\sum x^2) - (\sum x)^2}\sqrt{n(\sum y^2) - (\sum y)^2}}$$

where:
x represents components of the time series stimuli data vectors,
y represents components of the time series response data vectors, and
n is a number of {x, y} pairs used.

5. The computer-implemented method as set forth in claim 1, wherein the small signal attributes include sequences of attributes, values and measurements of the event notification.

6. The computer-implemented method as set forth in claim 1, wherein the event notifications include marketing messages deployed across television channels.

7. The computer-implemented method as set forth in claim 6, wherein the small signal attributes include attributes that define a television spot.

8. The computer-implemented method as set forth in claim 1, wherein the channels include channels associated with an Internet of Things System.

9. A computer program product embodied in a non-transitory computer readable medium, the computer readable medium having stored thereon a sequence of instructions which, when executed by a processor causes the processor to execute a process to present a user interface with campaign spend allocations based on attribution of small signal stimulus in noisy response channels, the process comprising:

generating, in a computer, from stimuli data associated with at least one channel, a plurality of time series stimuli data vectors from event notifications for an event propagated through a channel over a period of time to a plurality of users, the event notifications being associated with a plurality of small signal attributes specified at a sub-channel level of the channel;

generating, from aggregated response data associated with the event and including a plurality of user responses to the event, a plurality of time series response data vectors from responses elicited over time;

generating, using machine-learning techniques in a computer, a small signal correlation engine, to correlate at least one of the time series stimuli data vectors to one of the time series response data vectors, and generate a plurality of correlation coefficients that correlate the event notifications to the aggregated response data;

generating, using machine-learning techniques in a computer, a learning model to simulate variations of the stimuli data based on stimuli and aggregated response data to predict user responses using the correlation coefficients, including computing a contribution value of at least one of the plurality of small signal attributes of at least one of the event notifications;

updating the learning model based on a comparison of the predicted user responses to actual user responses to the event;

generating a media spend allocation for the channel and at least one of a sub-channel associated with the channel or another channel based on the contributions of the event notifications associated with the channel and the at least one of the sub-channel associated with the channel or the other channel and a budget received via a user interface;

displaying the media spend allocation to a user via the user interface;

simulating an effect of an adjustment to the media spend allocation, received via the user interface, based on the predicted user responses simulated by the learning model; and presenting, via the user interface, the adjusted media spend allocation and predicted user response activity based on the adjustment determined by the simulating.

10. The computer program product as set forth in claim 9, further including filtering the aggregated response data with a transfer function, h(n), that includes a first portion of the response data vectors and excludes a second portion of the response data vectors.

11. The computer program product as set forth in claim 10, wherein the transfer function, h(n), is based on a geographical origin of the responses, the IP address of the users, a response time, or a response channel.

12. The computer program product as set forth in claim 9, wherein generating, using machine-learning techniques in a computer, a small signal correlation engine in accordance with the expression:

$$r = \frac{n\sum xy - (\sum x)(\sum y)}{\sqrt{n(\sum x^2) - (\sum x)^2} \sqrt{n(\sum y^2) - (\sum y)^2}}$$

where:
- x represents components of the time series stimuli data vectors,
- y represents components of the time series response data vectors, and
- n is a number of {x, y} pairs used.

13. The computer program product as set forth in claim 9, wherein the small signal attributes include sequences of attributes, values and measurements of the event notification.

14. The computer program product as set forth in claim 9, wherein the event notifications include marketing messages deployed across television channels.

15. The computer program product as set forth in claim 14, wherein the small signal attributes include attributes that define a television spot.

16. The computer program product as set forth in claim 9, wherein the channels include channels associated with an Internet of Things System.

17. A computer system comprising:
- a computer processor to execute a set of program code instructions to present a user interface with campaign spend allocations based on attribution of small signal stimulus in noisy response channels; and
- a memory to hold the program code instructions, in which the program code instructions includes program code to perform:
  - generating, in a computer, from stimuli data associated with at least one channel, a plurality of time series stimuli data vectors from event notifications for an event propagated through a channel over a period of time to a plurality of users, the event notifications being associated with a plurality of small signal attributes specified at a sub-channel level of the channel;
  - generating, from aggregated response data associated with the event and including a plurality of user responses to the event, a plurality of time series response data vectors from responses elicited over time;
  - generating, using machine-learning techniques in a computer, a small signal correlation engine, to correlate at least one of the time series stimuli data vectors to one of the time series response data vectors, and generate a plurality of correlation coefficients that correlate of the event notifications, to the aggregated response data;
  - generating, using machine-learning techniques in a computer, a learning model to simulate variations of the stimuli data based on stimuli and aggregated response data to predict user responses using the correlation coefficients, including computing a contribution value of at least one of the plurality of small signal attributes of at least one of the event notifications;
  - updating the learning model based on a comparison of the predicted user responses to actual user responses to the event;
  - generating a media spend allocation for the channel and at least one of a sub-channel associated with the channel or another channel based on the contributions of the event notifications associated with the channel and the at least one of the sub-channel associated with the channel or the other channel and a budget received via a user interface;
  - displaying the media spend allocation to a user via the user interface;
  - simulating an effect of an adjustment to the media spend allocation, received via the user interface, based on the predicted user responses simulated by the learning model; and
  - presenting, via the user interface, the adjusted media spend allocation and predicted user response activity based on the adjustment determined by the simulating.

18. The computer system as set forth in claim 17, further including filtering the aggregated response data with a transfer function, h(n), based on a geographical origin of the responses, the IP address of the users, a response time, or a response channel.

19. The computer system as set forth in claim 17, wherein the event notifications include marketing messages deployed across television channels.

20. The computer system as set forth in claim 19, wherein the small signal attributes include attributes that define a television spot.

* * * * *